United States Patent
Takagi et al.

(10) Patent No.: US 10,731,098 B2
(45) Date of Patent: Aug. 4, 2020

(54) LUBRICATING OIL COMPOSITION, METHOD FOR DEFOAMING LUBRICATING OIL, AND DEFOAMING AGENT COMPOSITION

(71) Applicant: JXTG NIPPON OIL & ENERGY CORPORATION, Tokyo (JP)

(72) Inventors: Akira Takagi, Tokyo (JP); Go Tatsumi, Tokyo (JP)

(73) Assignee: JXTG NIPPON OIL & ENERGY CORPORATION, Tokyo (JP)

(*) Notice: Subject to any disclaimer, the term of this patent is extended or adjusted under 35 U.S.C. 154(b) by 149 days.

(21) Appl. No.: 15/749,904

(22) PCT Filed: Aug. 19, 2016

(86) PCT No.: PCT/JP2016/074298
§ 371 (c)(1),
(2) Date: Feb. 2, 2018

(87) PCT Pub. No.: WO2017/030204
PCT Pub. Date: Feb. 23, 2017

(65) Prior Publication Data
US 2018/0223219 A1  Aug. 9, 2018

(30) Foreign Application Priority Data

Aug. 19, 2015 (JP) ................... 2015-162280
Aug. 12, 2016 (JP) ................... 2016-159029
Aug. 12, 2016 (JP) ................... 2016-159030

(51) Int. Cl.
*C10M 155/02* (2006.01)
*C10M 157/10* (2006.01)
(Continued)

(52) U.S. Cl.
CPC ........... *C10M 155/02* (2013.01); *B01D 19/04* (2013.01); *B01D 19/0409* (2013.01);
(Continued)

(58) Field of Classification Search
CPC .............. C10M 155/02; C10M 145/14; C10M 157/10; C10M 159/005; C10M 169/041;
(Continued)

(56) References Cited

U.S. PATENT DOCUMENTS 4,082,690 A * 4/1978 Farminer ........... B01D 19/0409
516/123
4,906,403 A * 3/1990 Berger ............... B01D 19/0409
516/123
(Continued)

FOREIGN PATENT DOCUMENTS

CA   2359946      7/2000
CN   1064884 A    9/1992
(Continued)

OTHER PUBLICATIONS

International Search Report of PCT/JP2016/074298, dated Nov. 22, 2016.
(Continued)

*Primary Examiner* — James C Goloboy
(74) *Attorney, Agent, or Firm* — Greenblum & Bernstein, P.L.C.

(57) ABSTRACT

A lubricating oil composition including: a lubricant base oil; (A) a first defoaming agent obtainable by a process, the process including the step of: polymerizing (b) at least one defoaming agent monomer in (a) a polymerization solvent under coexistence of (c) a polymer soluble in the polymerization solvent; and (B) a second defoaming agent being a silicone defoaming agent.

16 Claims, 1 Drawing Sheet

(51) Int. Cl.
    *B01D 19/04* (2006.01)
    *C10M 159/00* (2006.01)
    *C10M 169/04* (2006.01)
    *C10M 145/14* (2006.01)

(52) U.S. Cl.
    CPC ...... *C10M 157/10* (2013.01); *C10M 159/005* (2013.01); *C10M 169/041* (2013.01); *C10M 145/14* (2013.01); *C10M 2209/084* (2013.01); *C10M 2229/02* (2013.01); *C10M 2229/041* (2013.01); *C10M 2229/048* (2013.01); *C10N 2220/021* (2013.01); *C10N 2220/082* (2013.01); *C10N 2230/18* (2013.01); *C10N 2240/04* (2013.01); *C10N 2240/08* (2013.01); *C10N 2240/10* (2013.01); *C10N 2270/00* (2013.01)

(58) Field of Classification Search
    CPC ...... C10M 2209/084; C10M 2229/041; C10M 2229/048; C10N 2220/021; C10N 2220/082; C10N 2230/18; C10N 2240/04; C10N 2240/08; C10N 2240/10; C10N 2270/00; B01D 19/04; B01D 19/0409
    See application file for complete search history.

(56) References Cited

U.S. PATENT DOCUMENTS

| | | | |
|---|---|---|---|
| 5,766,513 A | 6/1998 | Pillon et al. | |
| 2008/0207825 A1 | 8/2008 | Stark | |
| 2009/0116808 A1 | 5/2009 | Kyota et al. | |
| 2011/0163254 A1 | 7/2011 | Stark | |
| 2011/0287206 A1 | 11/2011 | Suwa et al. | |
| 2013/0244917 A1 | 9/2013 | Obrecht et al. | |
| 2014/0018267 A1* | 1/2014 | Loop | C10M 155/02 508/206 |
| 2014/0045053 A1 | 2/2014 | Ichikawa et al. | |
| 2015/0218482 A1* | 8/2015 | Ito | C10M 161/00 508/409 |
| 2016/0281019 A1* | 9/2016 | Deklippel | C08G 77/24 |
| 2018/0208870 A1 | 7/2018 | Takagi et al. | |
| 2018/0208871 A1 | 7/2018 | Takagi et al. | |
| 2019/0256790 A1 | 8/2019 | Takagi et al. | |

FOREIGN PATENT DOCUMENTS

| | | |
|---|---|---|
| CN | 1066662 A | 12/1992 |
| CN | 101263182 | 9/2008 |
| EP | 0632157 | 1/1995 |
| EP | 1182236 | 2/2001 |
| EP | 2617745 | 7/2013 |
| JP | 05-228306 | 9/1993 |
| JP | 8-126801 | 5/1996 |
| JP | 11-209778 | 8/1999 |
| JP | 2000-087065 A | 3/2000 |
| JP | 2002-066206 | 3/2002 |
| JP | 2002-301306 | 10/2002 |
| JP | 2008-120889 A | 5/2008 |
| JP | 2008-542462 | 11/2008 |
| JP | 2009-235252 A | 10/2009 |
| JP | 2012-046762 | 3/2012 |
| JP | 2012-146762 | 3/2012 |
| JP | 2014-177608 | 9/2014 |
| JP | 2016-016367 | 2/2016 |
| WO | 2008/025718 | 3/2008 |
| WO | 2008046862 A1 | 4/2008 |
| WO | 2008/055998 | 5/2008 |
| WO | 2017/030201 | 2/2017 |
| WO | 2017/030203 | 2/2017 |

OTHER PUBLICATIONS

International Preliminary Report on Patentability of PCT/JP2016/074298, dated Nov. 22, 2016.
NOA issued in U.S. Appl. No. 15/749,919 dated Dec. 3, 2019.
NOA issued in U.S. Appl. No. 15/749,875 dated Jan. 2, 2020.
ISR of PCT/JP2016/074296 dated Nov. 1, 2016.
IPRP of PCT/JP2016/074296 dated Feb. 20, 2018.
ISR of PCT/JP2018/006536 dated May 1, 2018.
IPRP of PCT/JP2018/006536 dated Aug. 27, 2019.
US OA issued in U.S. Appl. No. 15/749,912 dated Sep. 25, 2019.
ISR of PCT/JP2016/074295 dated Nov. 1, 2016.
IPRP of PCT/JP2016/074295 dated Feb. 20, 2018.
ISR of PCT/JP2016/074297 dated Nov. 1, 2016.
IPRP of PCT/JP2016/074297 dated Febmary 20, 2018.
US OA issued in U.S. Appl. No. 15/749,875 dated Aug. 19, 2019.
US OA issued in U.S. Appl. No. 15/749,919 dated Aug. 16, 2019.

* cited by examiner

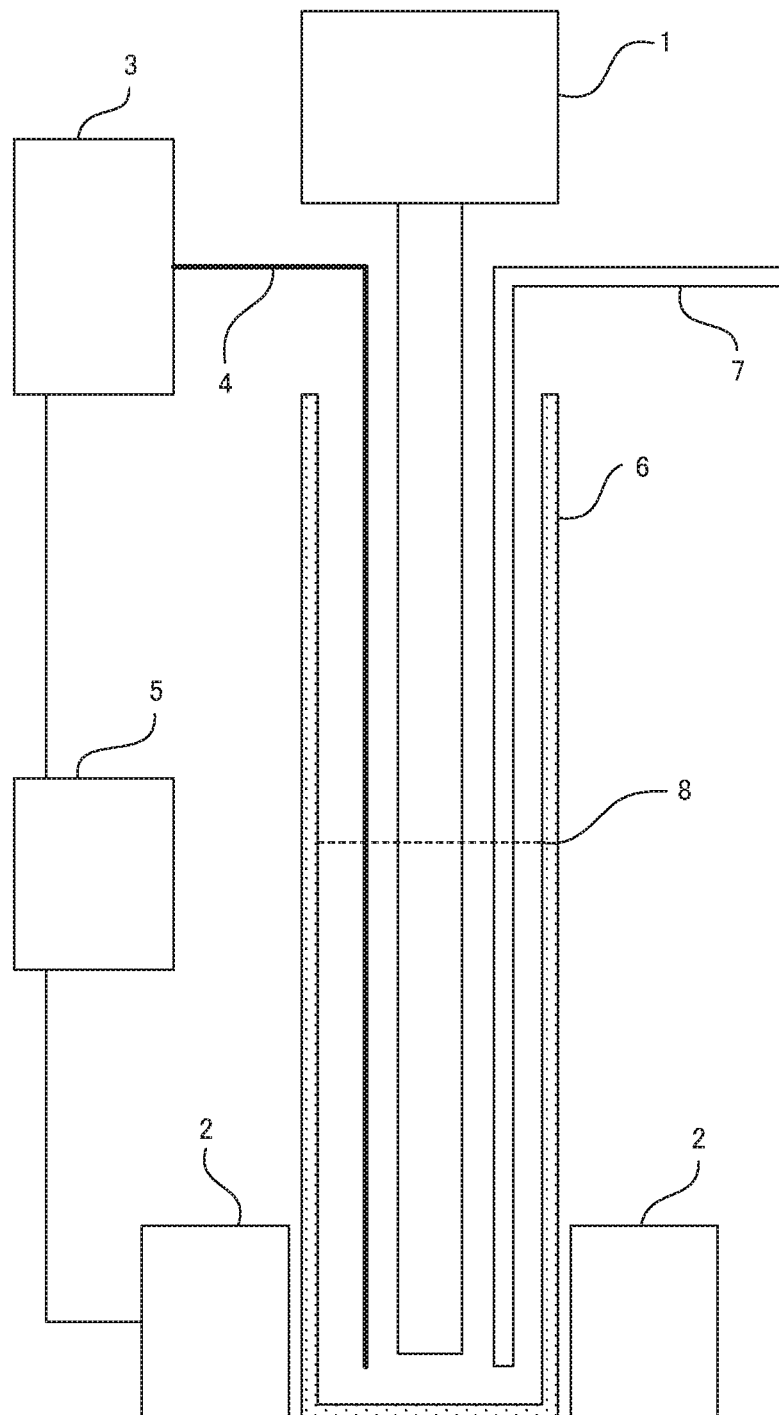

LUBRICATING OIL COMPOSITION, METHOD FOR DEFOAMING LUBRICATING OIL, AND DEFOAMING AGENT COMPOSITION

FIELD

The present invention relates to lubricating oil compositions, methods for defoaming lubricating oil, and defoaming agent compositions.

BACKGROUND

Lubricating oil is used in various kinds of machinery so as to improve lubricity between members. Increase of foaming of the lubricating oil may lead to insufficient lubrication, failure to control hydraulic pressure, deteriorated cooling efficiency, and so on. Thus, lubricating oil is required to suppress foaming.

For example, automobile engines, transmissions, and axle units are demanding increasingly more from lubricating oil, accompanying their recent improvements in performance and fuel efficiency. Continuous high-load operation or high-speed driving increases foaming in engine oil, transmission oil, or axle unit oil, and as a result, leads to problems such as: failure to control hydraulic pressure due to incorporation of foam in hydraulic circuits; deteriorated lubricating performance or cooling efficiency due to foaming; wear and seizure due to breakage of oil films in friction portions; and promoted deterioration of lubricating oil due to oil temperature increase. Thus, there is demand for engine oil, transmission oil, and axle unit oil which can maintain high defoaming performance so as to suppress foaming for a long time from the initial stage of use.

Generally, lubricating oil contains base oil, and various additives incorporated according to desired characteristics. Examples of additives include defoaming agents to prevent foaming of lubricating oil. Polysiloxane defoaming agents (silicone defoaming agents) are conventionally known as defoaming agents. For example. Patent Literature 1 describes a lubricating oil composition formed by incorporating (a) polydimethylsiloxane having kinematic viscosity at 25° C. of 300,000 to 1,500,000 mm²/s, and (b) fluorinated polysiloxane having kinematic viscosity at 25° C. of 500 to 9,000 mm²/s. Patent Literature 2 discloses incorporating polydimethylsiloxane having a specific molecular weight distribution into lubricating oil to obtain defoaming effect on foam generated due to high-speed stirring.

CITATION LIST

Patent Literature

Patent Literature 1: JP 2000-87065 A
Patent Literature 2: JP 2009-235252 A
Patent Literature 3: JP 2008-120889 A

SUMMARY

Technical Problem

Generally, defoaming agents exhibit defoaming performance by being used while being finely dispersed in lubricating oil compositions. However, disadvantageously large specific gravity of polysiloxane defoaming agents (silicone defoaming agents) makes it easy to cause precipitation and unevenness in concentration during long-term storage in bottles or long-term use in machinery, which leads to gradual loss of defoaming effect in course of time, which results in increased foaming of lubricating oil.

For example, torque converters included in automatic transmissions, pulleys included in metal belt-type continuously variable transmissions, etc. have positions where very large centrifugal effect occurs. When lubricating oil is supplied to such a position, a silicone defoaming agent compound is separated by such centrifugal effect, and concentrates in a specific position of the machinery, which leads to decreased concentration of a defoaming agent in the lubricating oil circulating in the machinery, and thus to increased foaming of the lubricating oil.

A first object of the present invention is to provide a lubricating oil composition which can suppress deterioration of defoaming performance even during long-term storage, and can maintain defoaming performance of lubricating oil for a long term even under such lubricating conditions that the lubricating oil is subjected to high centrifugal effect.

A second object of the present invention is to provide a method for defoaming lubricating oil which method can effectively suppress deterioration of defoaming performance due to segregation and precipitation of a defoaming agent.

The present invention also provides a defoaming agent composition that can be preferably used for preparation of the above described lubricating oil composition, and in the above described method for defoaming lubricating oil.

Solution to Problem

The present invention encompasses the following embodiments [1] to [16]:

[1] A lubricating oil composition comprising: a lubricant base oil; (A) a first defoaming agent obtainable by a process, the process comprising the step of: polymerizing (b) at least one defoaming agent monomer in (a) a polymerization solvent under coexistence of (c) a polymer soluble in the polymerization solvent; and (B) a second defoaming agent being a silicone defoaming agent.

[2] The lubricating oil composition according to [1], the (b) at least one defoaming agent monomer comprising a first monomer, the first monomer giving a repeating unit represented by the following general formula (1) upon polymerization:

wherein in the general formula (1), $X^1$ is a repeating unit obtainable by polymerization of an ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

wherein in the general formula (2), $R^1$ and $R^2$ are each independently a $C_{1-18}$ organic group or combination of two or more $C_{1-18}$ organic groups.

[3] The lubricating oil composition according to [1] or [2], wherein a ratio of a content of the (A) first defoaming agent in terms of silicon to a content of the (B) second defoaming agent in terms of silicon is 0.01 to 100.

[4] The lubricating oil composition according to any one of [1] to [3], wherein the polymerizing step is carried out by dispersion polymerization; and the (c) polymer soluble in the polymerization solvent is (c1) a polymer dispersant.

[5] The lubricating oil composition according to [4], the (a) polymerization solvent comprising a hydrocarbon solvent having 6 or more carbons, a mineral oil, a synthetic oil, or an ester oil, or combination thereof.

[6] The lubricating oil composition according to [4] or [5], the (c1) polymer dispersant comprising a polyalkyl (meth)acrylate having a weight average molecular weight of 10,000 to 1,000,000.

In the present description, "(meth)acrylate" means "acrylate and/or methacrylate", and "(meth)acryl" means "acryl" and/or "methacryl".

[7] The lubricating oil composition according to any one of [1] to [3], wherein the polymerizing step is carried out by solution polymerization.

[8] The lubricating oil composition according to [7], the (c) polymer soluble in the polymerization solvent comprising a polyalkyl (meth)acrylate having a weight average molecular weight of 10.000 to 1,000,000.

[9] A method for defoaming a lubricating oil, the method comprising the steps of: (i) dissolving or finely dispersing (A) a first defoaming agent and (B) a second defoaming agent in a diluting solvent, to obtain a dilution, such that a total concentration of the (A) first defoaming agent and the (B) second defoaming agent in the dilution is 500 to 50,000 mass ppm in terms of silicon; and (ii) adding the dilution obtained in the step (i) to a lubricating oil, the (A) first defoaming agent being obtainable by a process, the process comprising the step of: polymerizing (b) at least one defoaming agent monomer in (a) a polymerization solvent under coexistence of (c) a polymer soluble in the polymerization solvent; and the (B) second defoaming agent being a silicone defoaming agent.

[10] The method according to [9], the diluting solvent comprising a hydrocarbon solvent having 6 or more carbons, a mineral oil, a synthetic oil, an ester oil, an aliphatic ether having 4 or more carbons, an ester of an aliphatic monocarboxylic acid having 2 or more carbons and a monoalcohol having 1 to 5 carbons, an aliphatic ketone having 3 or more carbons, an aliphatic alcohol having 4 or more carbons, or a halogenated hydrocarbon, or combination thereof.

[11] The method according to [9] or [10], wherein the polymerizing step is carried out by dispersion polymerization; and the (c) polymer soluble in the polymerization solvent is (c1) a polymer dispersant.

[12] The method according to [9] or [10], wherein the polymerizing step is carried out by solution polymerization.

[13] A defoaming agent composition comprising: (A) a first defoaming agent obtainable by a process, the process comprising the step of: polymerizing (b) at least one defoaming agent monomer in (a) a polymerization solvent under coexistence of (c) a polymer soluble in the polymerization solvent; and (B) a second defoaming agent being a silicone defoaming agent.

[14] The defoaming agent composition according to [13], further comprising: a diluting solvent, the diluting solvent comprising a hydrocarbon solvent having 6 or more carbons, a mineral oil, a synthetic oil, an ester oil, an aliphatic ether having 4 or more carbons, an ester of an aliphatic monocarboxylic acid having 2 or more carbons and a monoalcohol having 1 to 5 carbons, an aliphatic ketone having 3 or more carbons, an aliphatic alcohol having 4 or more carbons, or a halogenated hydrocarbon, or combination thereof.

[15] The defoaming agent composition according to [13] or [14], wherein the polymerization step is carried out by dispersion polymerization; and the (c) polymer soluble in the polymerization solvent is (c1) a polymer dispersant.

[16] The defoaming agent composition according to [13] or [14], wherein the polymerization step is carried out by solution polymerization.

Advantageous Effects of Invention

The lubricating oil composition of the present invention can suppress deterioration of defoaming performance even during long-term storage, and maintain defoaming performance of lubricating oil for a long term even under such lubricating conditions that the lubricating oil is subjected to high centrifugal effect.

The method for defoaming lubricating oil of the present invention can effectively suppress deterioration of defoaming performance due to segregation and precipitation of a defoaming agent.

The defoaming agent composition of the present invention can be preferably used for preparation of the lubricating oil composition of the present invention, and in the defoaming method of the present invention.

BRIEF DESCRIPTION OF DRAWINGS

FIG. 1 is an explanatory view of the structure of a homogenizer test machine that is used for the evaluation of defoaming performance.

DETAILED DESCRIPTION OF EMBODIMENTS

The present invention will be described hereinafter. Expression "A to B" concerning numeral ranges means "no less than A and no more than B" unless otherwise specified. In such expression, if a unit is added only to the numeral value B, the same unit is applied to the numeral value A.

<1. Lubricating Oil Composition>

The lubricating oil composition of the present invention comprises: a lubricant base oil; (A) a first defoaming agent; and (B) a second defoaming agent.

(Lubricant Base Oil)

A lubricant base oil in the lubricating oil composition of the present invention is not restricted, but a mineral base oil or a synthetic base oil used for general lubricating oil can be used.

Specific examples of mineral base oils include oils obtained from refining lubricant oil fractions that are obtained by vacuum distillation of atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by a Fischer-Tropsch process, and the like.

Examples of synthetic base oils include: poly-α-olefins such as 1-octene oligomer and 1-decene oligomer, or hydrogenated products thereof; isobutene oligomer or hydrogenated product thereof; paraffin; diesters (such as ditridecyl glutarate, bis(2-ethylhexyl) azipate, diisodecyl azipate, ditridecyl azipate, and bis(2-ethylhexyl) sebacate); polyol esters (such as trimethylolpropane caprilate, trimethylolpropane pelargonate, pentaerythritol 2-ethylhexanoate, and pentaerythritol pelargonate); poly oxyalkylene glycol; dialkyl diphenyl ether; and polyphenyl ether. Examples other than them include: aromatic synthetic oils such as alkylnaphthalene, alkylbenzene, and aromatic esters, or mixtures thereof.

In the lubricating oil composition of the present invention, mineral base oils, synthetic base oils, any mixture of two or more lubricating oil selected therefrom, or the like can be used as the lubricant base oil. Examples thereof include at least one mineral base oil, at least one synthetic base oil, and mixed oil of at least one mineral base oil and at least one synthetic base oil.

The kinematic viscosity of the base oil at 100° C. is preferably 1.0 to 50 mm²/s. Too high kinematic viscosity of the base oil tends to lead to deteriorated low-temperature viscosity. In contrast, too low kinematic viscosity of the base oil leads to deteriorated anti-wear performance on sliding parts of various kinds of machinery. In view of preventing viscosity decrease of the obtained lubricating oil composition, the kinematic viscosity of the base oil at 100° C. is preferably 2.0 to 15 mm²/s, and especially preferably 3 to 10 mm²/s.

The pour point of the base oil is not restricted but preferably is no more than −10° C., and especially preferably no more than −15° C.

The viscosity index of the base oil is preferably no less than 105 in view of preventing viscosity decrease at high temperature.

<(A) First Defoaming Agent>

A first defoaming agent is a defoaming agent obtainable by a process, the process comprising the step of: polymerizing (b) at least one defoaming agent monomer (hereinafter may be referred to as "(b) defoaming agent monomer", or simply "component (b)") in (a) a polymerization solvent (hereinafter may be simply referred to as "component (a)") under coexistence of (c) a polymer soluble in the polymerization solvent (hereinafter may be referred to as "(c) coexisting polymer", or simply "component (c)"). One first defoaming agent may be used alone, or two or more first defoaming agents may be used in combination.

(Polymerization System)

Any known polymerization system in which polymerization is conducted in a solvent can be employed, and radical polymerization can be preferably employed as a polymerization system. Examples of polymerization systems that can be employed in the present invention include: dispersion polymerization, suspension polymerization, miniemulsion polymerization, microemulsion polymerization, emulsion polymerization, and solution polymerization. Among them, dispersion polymerization and solution polymerization can be preferably employed. Examples of radical polymerization include conventional radical polymerization, and living radical polymerization. Conventional radical polymerization can be preferably employed.

((a) Polymerization Solvent)

A solvent suitable for the employed polymerization system can be suitably selected as the polymerization solvent from solvents which can dissolve the (c) coexisting polymer (described later), and preferably solvents which can dissolve the (b) defoaming agent monomer and the (c) coexisting polymer.

((b) Defoaming Agent Monomer)

A radical polymerizable defoaming agent monomer can be preferably used, and a radical polymerizable defoaming agent monomer comprising a polysiloxane macromonomer having at least one radical polymerizable ethylenic unsaturated group can be especially preferably used as the defoaming agent monomer. That is, the (b) defoaming agent monomer preferably comprises a monomer giving a repeating unit represented by the following general formula (1) upon polymerization (hereinafter may be referred to as "polysiloxane macromonomer"). Using such a radical polymerizable macromonomer gives the obtained defoaming agent polymer good defoaming performance.

(1)

In the general formula (1), $X^1$ is a repealing unit obtainable by polymerization of an ethylenic unsaturated group, which composes a main chain. $Y^1$ is a side chain comprising a linear or branched polysiloxane structure, the polysiloxane structure comprising a repeating unit represented by the following general formula (2) and having a polymerization degree of 5 to 300. $Z^1$ is a linking group linking the repeating unit $X^1$ and the side chain $Y^1$.

$X^1$ may be a combination of two or more repeating units, $Y^1$ may be a combination of two or more side chains, and $Z^1$ may be a combination of two or more linking groups.

$Y^1$ is a side chain comprising a linear or branched polysiloxane structure that comprises a repeating unit represented by the following general formula (2) and having a polymerization degree of 5 to 300. The polymerization degree of the polysiloxane structure is preferably no less than 10, and more preferably no less than 30; and preferably no more than 250, and more preferably no more than 200. The polymerization degree of less than 5 leads to deteriorated shear stability or defoaming performance of the defoaming agent. The polymerization degree of more than 300 leads to significant decrease of polymerization activity of the monomer.

(2)

wherein in the formula (2), $R^1$ and $R^2$ are each independently a $C_{1-18}$ organic group or combination of two or more $C_{1-18}$ organic groups.

The polysiloxane structure of $Y^1$ may be linear or branched. Here the linear polysiloxane structure means the structure represented by the following general formula (3):

(3)

In the general formula (3), $R^1$ and $R^2$ are as defined above, and n represents the polymerization degree.

Regarding $Y^1$, the branched polysiloxane structure is obtainable by replacing $R^1$ and/or $R^2$ on the Si atom in one or more repeating units represented by the general formula (3) with a polysiloxane side chain comprising the repeating unit represented by the general formula (2). In the branched polysiloxane structure, the polysiloxane side chain may further comprise one or more branches. The polymerization degree of the polysiloxane structure equals to the total number of Si atoms thereof.

In the general formulae (2) and (3), examples of organic groups having 1 to 18 carbons include: substituted or unsubstituted alkyl groups, substituted or unsubstituted phenyl groups, fluoroalkyl groups, and polyether groups. Examples of substituents in substituted alkyl groups and substituted phenyl groups include hydroxy group, amino groups, ether bond, and ester bond. The carbon numbers of $R^1$ and $R^2$ are 1 to 18, 1 to 12 in one embodiment, and 1 to 6 in another embodiment. Preferred examples of the organic groups include: methyl group, phenyl group, and fluoroalkyl groups. Among them, methyl group can be especially preferably employed.

A chain end of the polysiloxane structure of $Y^1$ which is not bonded with the linking group $Z^1$ may be bonded with, for example, the same group as $R^1$ or $R^2$ in the formulae (2) and (3), a $C_{1-12}$ hydrocarbyl group, a $C_{1-12}$ monovalent organic group having one or more functional groups (such as hydroxy group, amino groups, ether bond, ester bond, and amide bond), or a hydroxy group.

The linking group $Z^1$ is not limited as long as being able to link the repeating unit (main chain skeleton) $X^1$ and the side chain $Y^1$. Preferable examples of $Z^1$ include linking groups having an ester bond, an amide bond, an ether bond, a thioether bond, a thioester bond, a thionoester bond, a thioamide bond, or an imide bond. The linking group $Z^1$ may comprise one or more groups selected from linear or branched alkyl or alkylene groups, alicyclic groups, and aromatic groups, in addition to the above listed chemical bonds. The carbon number of the linking group $Z^1$ is not limited, but is no less than 0, preferably no more than 12, and more preferably no more than 6.

A monomer having a (meth)acryloyl group on one end of its molecule, which is represented by the following general formula (4), can be preferably used as the above described polysiloxane macromonomer. In the present description, "(meth)acryl" means acryl and/or methacryl, and "(meth)acryloyl" means acryloyl and/or methacryloyl.

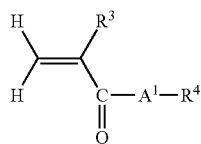

(4)

In the formula (4), $R^3$ is a hydrogen atom or a methyl group; $R^4$ is an organic group comprising a linear or branched polysiloxane structure, the polysiloxane structure comprising a repeating unit represented by the general formula (2) and having a polymerization degree of 5 to 300; and $A^1$ is an —O— group, a —NH— group, or a —S— group.

The polymerization degree of the polysiloxane structure of $R^4$ of less than 5 leads to deteriorated shear stability of the obtained defoaming agent polymer, which is thus unfavorable. The polymerization degree of the polysiloxane structure of more than 300 leads to significant decrease of polymerization activity of the monomer, which is thus unfavorable. The polymerization degree of the polysiloxane structure of $R^4$ is preferably no less than 10, and more preferably no less than 30; and preferably no more than 250, and more preferably no more than 200.

The —C(O)-$A^1$- moiety in the general formula (4) constitutes least part of the linking group $Z^1$ in the general formula (1). The polysiloxane structure of $R^4$ may be directly bonded to $A^1$, or may be bonded to $A^1$ via an organic group. Examples of an organic group that links the polysiloxane structure and $A^1$ include: $C_{1-12}$ hydrocarbon groups, and $C_{1-12}$ hydrocarbon groups having one or more functional group (such as hydroxy group, amino group, acyl group, ether group, ester group, and amide group).

As the defoaming agent monomer, the polysiloxane macromonomer may be used alone, or may be used in combination with other radical polymerizable monomer(s) as long as defoaming performance is not impaired. One example of the other radical polymerizable monomers to be copolymerized with the polysiloxane macromonomer is a monomer which gives the repeating unit represented by the following general formula (5) upon polymerization (hereinafter may be simply referred to as "fluorinated monomer"):

(5)

In the formula (5), $X^2$ is a repeating unit obtainable by polymerization of an ethylenic unsaturated group; $Y^2$ is a side chain comprising no less than 3 fluorine atoms; and $Z^2$ is a linking group linking the repeating unit $X^2$ and the side chain $Y^2$.

In the formula (5), the groups same as those described above concerning $X^1$ can be employed as $X^2$. Preferred embodiments of $X^2$ are also same as those described above concerning $X^1$. The groups same as those described above concerning $Z^1$ can be employed as $Z^2$. Preferred embodiments of $Z^2$ are also same as those described above concerning $Z^1$. In the polymer, $X^2$ may be a combination of two or more repeating units, $Y^2$ may be a combination of two or more side chains, and $Z^2$ may be a combination of two or more linking groups.

$Y^2$ is a side chain comprising no less than 3 fluorine atoms. An organic group comprising no less than 3 fluorine atoms can be employed as $Y^2$ without any specific limitation. A fluoroalkyl group or a fluoroalkyl (poly)ether group can be preferably employed.

The number of fluorine atoms in the side chain $Y^2$ is no less than 3, preferably no less than 5, and more preferably no more than 17. The number of fluorine atoms in the side chain $Y^2$ of this lower limit or over leads to improved defoaming performance. The number of fluorine atoms in the side chain $Y^2$ over this upper limit makes it easy for the obtained polymer to solidify, and thus leads to deteriorated defoaming performance, which is thus unfavorable.

Examples of fluoroalkyl groups include: a $C_{1-4}$ perfluoroalkyl groups; groups represented by the following general formula (6); groups represented by the following general formula (7); 1,1,1,3,3,3-hexafluoro-2-propyl group; 2,2-bis(trifluoromethyl)propyl group perfluorocyclohexylmethyl group; pentafluorobenzyl group; 2,3,5,6-tetrafluorophenyl group 2,2,2-trifluoro-1-phenyl-1-(trifluoromethyl)ethyl) group and 3-(trifluoromethyl)benzyl group.

$$—(CH_2)_p—C_qF_{2q}E \quad (6)$$

In the formula (6), E is a fluorine atom or hydrogen atom; p is an integer of 1 to 6; q is an integer of 1 to 15; and when q is 1, E is a fluorine atom.

In the general formula (6), q is preferably no less than 2, and preferably no more than 8. q of this lower limit or over leads to improved defoaming performance, q over this upper limit makes it easy for the obtained polymer to solidify, and thus leads to deteriorated defoaming performance which is thus unfavorable.

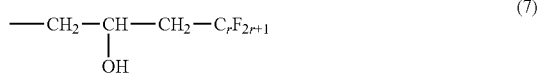

$$—CH_2—\underset{OH}{CH}—CH_2—C_rF_{2r+1} \quad (7)$$

In the formula (7), r is an integer of 2 to 9.

In the general formula (7), r is preferably no less than 4 and preferably no more than 8. r of this lower limit or over leads to improved defoaming performance. r over this upper limit makes it easy for the obtained polymer to solidify, and thus leads to deteriorated defoaming performance, which is thus unfavorable.

Examples of the $C_{1-4}$ perfluoroalkyl group include: trifluoromethyl group, perfluoroethyl group, perfluoropropyl group, perfluoroisopropyl group, and perfluoro-tert-butyl group.

Examples of the group represented by the general formula (6) include: 2,2,2-trifluoroethyl group; 1H,1H,3H-hexafluorobutyl group 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group 2-(perfluorohexyl)ethyl group; 2-(perfluorooctyl)ethyl group; 3-(perfluorohexyl)propyl group; 3-(perfluorooctyl) propyl group 1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylethyl)hexyl group; 11H-(3,5,5-tris(trifluoromethyl))octafluorohexyl group; 1H,1H,11H-eicosafluoroundecyl group; 2-(perfluoro-3-methylbutyl)ethyl group; 1H,1H-perfluoropropyl group; 1H,1H-perfluorobutyl group; 1H,1H-perfluoropentyl group; 1H,1H-perfluorohexyl group; 1H,1H-perfluoroheptyl group; 1H,1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl) ethyl group; and 2-(perfluoro-9-methyl decyl)ethyl group.

Examples of the group represented by the general formula (7) include: 3-(perfluorobutyl)-2-hydroxy propyl group; 3-(perfluoro-3-methylbutyl)-2-hydroxypropyl group; 3-(perfluorooctyl)-2-hydroxypropyl group; 3-(perfluoro-5-methylhexyl)-2-hydroxypropyl group; and 3-(perfluoro-7-methyloctyl)-2-hydroxypropyl group.

Examples of fluoroalkyl (poly)ether groups include: groups represented by the following general formula (8); 2-[(perfluoropropanoyl)oxy]ethyl group; and fluoropolyether groups comprising a perfluoropolyethylene oxide group, a perfluoropolypropylene oxide group, or a perfluoropolyoxetane group, and fluoropolyether copolymer groups thereof.

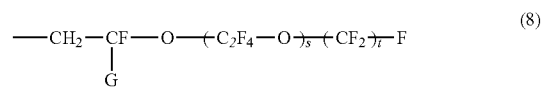

$$—CH_2—\underset{G}{CF}—O—(\!-C_2F_4—O\!-\!)_s(\!-CF_2\!-\!)_t—F \quad (8)$$

In the formula (8), G is a fluorine atom or a trifluoromethyl group; s is an integer of 0 to 2; and t is an integer of 1 to 4.

Examples of the group represented by the general formula (8) include: 1H,1H-perfluoro-3,6-dioxadecyl group; 1H,1H-perfluoro-3,6,9-trioxadecyl group; 1H,1H-perfluoro-3,6,9-trioxatridecyl group; 2-perfluoropropoxy-2,3,3,3-tetrafluoropropyl group; and 1H,1H-perfluoro-2,5-dimethyl-3,6-dioxanonyl group.

Among the above description, the group represented by the general formula (7) can be preferably employed as the side chain $Y^2$.

As the fluorinated monomer, the monomer having a (meth)acryloyl group, which is represented by the following formula (9), can be preferably used:

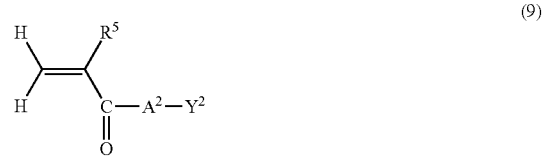

(9)

In the formula (9), $R^5$ is a hydrogen atom or a methyl group; $Y^2$ is as described above; and $A^2$ is an —O— group, a —NH— group, or a —S— group.

Other examples of the other radical polymerizable monomers to be copolymerized with the polysiloxane macromonomer include: (meth)acrylate esters having $C_{1-24}$ linear or branched alkyl group or fluoroalkyl group, styrene, (meth)acrylonitrile, vinylpyridine, vinyl acetate, and vinyl halides.

As the defoaming agent monomer, a multifunctional monomer having two or more radical polymerizable functional groups in one molecule may be used in addition to the above described polysiloxane macromonomer. Such a multifunctional monomer may be used together with the above described monofunctional radical polymerizable monomer. Addition of a multifunctional monomer to the dispersion polymerization system makes it possible to control the particle size of the obtained defoaming agent polymer. Multifunctional monomers that can be used in the present invention are not restricted as long as being soluble in the polymerization solvent, and specific examples thereof include; esters of (meth)acrylic acid and $C_{2-12}$ alkyl alcohols, $C_{2-12}$ alicyclic alkyl alcohols, or C2-12 aromatic multifunctional alcohols, such as ethylene glycol di(meth)acrylate, trimethylolpropane tri(meth)acrylate, and pentaerythritol tetra(meth)acrylate; di(meth)acrylates of poly (or oligo) alkylene glycols; and divinyl benzene.

The proportion of the polysiloxane macromonomer in the defoaming agent monomer is preferably no less than 10 mass %, more preferably no less than 50 mass %, further preferably no less than 65 mass %, especially preferably no less than 70 mass %, and may be 100 mass %, on the basis of the total mass of the defoaming agent monomer (100 mass %).

In view of improving defoaming performance, the proportion of the fluorinated monomer to the defoaming agent monomer is preferably no more than 50 mass %, more preferably no more than 35 mass %, and further preferably no more than 30 mass %, on the basis of the total mass of the defoaming agent monomer (100 mass %). The lower limit thereof is not restricted, and may be 0 mass %. In one embodiment, the lower limit may be no less than 2 mass %. In another embodiment, the lower limit may be no less than 5 mass %.

((c) Coexisting Polymer)

Examples of the coexisting polymer include: non-dispersant polyalkyl (meth)acrylate; dispersant polyalkyl (meth) acrylate having a polar group such as hydroxy group, amino group, or amide group in its side chain (the polar group may be introduced by random polymerization or block polymerization); comb-shaped polyalkyl (meth)acrylate having polyisobutylene in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; long-chain alkyl modified silicone; and EPDM (ethylene-propylene-diene rubber). The coexisting polymer can be suitably selected by the skilled person according to a specific polymerization solvent and polymerization system.

(Polymerization Conditions)

Reaction conditions of polymerization reaction can be suitably determined by the skilled person according to the employed polymerization system, polymerization solvent, defoaming agent monomer, and coexisting monomer.

(Defoaming Agent Particles)

A dispersion of defoaming agent particles can be obtained when polymerization reaction is completed in the above described various polymerization systems where polymerization is conducted in a solvent, except in solution polymerization. The average particle size of the defoaming agent particles after polymerization (average particle size obtained by dynamic light scattering and cumulant analysis) is preferably no more than 10 μm, more preferably no more than 5 μm, and especially preferably no more than 2 μm. The lower limit thereof is not restricted, but for example, may be no less than 0.05 μm. The average particle size of the defoaming agent particles of more than 10 μm tends to lead to significant segregation and precipitation of the defoaming agent, and thus to deteriorated defoaming performance.

<(A1) First Defoaming Agent Obtainable by Dispersion Polymerization>

In one preferred embodiment, the first defoaming agent is obtainable by dispersion polymerization. In dispersion polymerization, the (c) polymer soluble in the polymerization solvent (coexisting polymer) works as (c1) a polymer dispersant.

In dispersion polymerization, which is one embodiment of radical polymerization, polymerization of monomer is conducted under the presence of a polymer (polymer dispersant) dissolved in a solvent (polymerization solvent), such that on one hand, the monomer itself is soluble in the solvent, and on the other hand, a polymer formed by polymerization of the monomer insoluble in the solvent. In dispersion polymerization, polymerization initiates in a uniform solution, and thereafter the system gradually becomes a suspension because of formation of nuclei of particles by the polymer segregated accompanying the progress of the polymerization reaction. At this time, the polymer which is segregated accompanying the progress of the polymerization reaction is dispersed and stabilized as fine particles by the polymer (polymer dispersant) which is soluble in the solvent and exists in the system from the beginning. The polymer finally obtained is in the form of fine particles stably dispersed in the solvent.

((a) Polymerization Solvent)

The polymerization solvent used in dispersion polymerization is such a solvent that on one hand, the (b) defoaming agent monomer itself (in the form of monomer) is soluble in the solvent, and on the other hand, the polymer formed by polymerization of the (b) defoaming agent monomer is insoluble in the solvent.

The polymerization solvent in dispersion polymerization is preferably a solvent comprising at least one selected from hydrocarbon solvents having no less than 6 carbons, mineral oils, synthetic oils, and ester oils. A lubricant base oil such as a mineral oil and a synthetic oil is especially preferably used as the dispersion polymerization solvent.

((c1) Polymer Dispersant)

The polymer dispersant used in dispersion polymerization is restricted as long as it is soluble in the polymerization solvent, and is able to finely disperse the defoaming agent polymer after polymerization in the polymerization solvent. Examples of polymers that can be used as the (c1) polymer dispersant in dispersion polymerization include: non-dispersant polyalkyl (meth)acrylate; dispersant polyalkyl (meth) acrylate having a polar group such as hydroxy group, amino group, or amide group in its side chain (the polar group may be introduced by random polymerization or block polymerization); comb-shaped polyalkyl (meth)acrylate having polyisobutyl in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; long-chain alkyl modified silicone; EPDM (ethylene-propylene-diene rubber). In this description, "dispersant" polyalkyl (meth)acrylate means polyalkyl (methacrylate having a polar group such as hydroxy group, amino group, or amide group in its side chain, and "non-dispersant" polyalkyl (meth)acrylate means polyalkyl (meth)acrylate not having such a polar group in its side chain. While incorporation of the former polyalkyl (meth)acrylate in lubricating oil gives detergent dispersant effect detergent dispersant effect is not expected when the latter polyalkyl (meth)acrylate is incorporated in lubricating oil. Thus, in the technical field of lubricating oil, the former polyalkyl (meth)acrylate is referred to as "dispersant" polyalkyl (meth)acrylate, and the latter polyalkyl (meth)acrylate is referred to as "non-dispersant" polyalkyl (meth)acrylate. This description also follows this terminology in the technical field of lubricating oil concerning polyalkyl (meth) acrylate. It is, though, noted that in this description, even "non-dispersant" polyalkyl (meth)acrylate can work as the polymer dispersant in dispersion polymerization.

Among them, polyalkyl (meth)acrylate having a weight average molecular weight of 10,000 to 500,000 can be preferably used as the polymer dispersant in dispersion polymerization. Specifically preferred examples of such polyalkyl (meth)acrylate include polyalkyl (meth)acrylate having $C_{1-30}$ linear or branched alkyl groups. This polyalkyl (meth)acrylate may be dispersant, and may be non-dispersant. This polyalkyl (meth)acrylate may be a linear polymer, a comb-shaped polymer, or a star-shaped polymer. When polyalkyl (meth)acrylate is used as the polymer dispersant, the weight average molecular weight of polyalkyl (meth) acrylate of less than 10,000 leads to shortage of performance as a dispersant, which makes it difficult to form the obtained defoaming agent into fine particles. The weight average molecular weight of polyalkyl (meth)acrylate of more than 500,000 leads to too high viscosity of the system during dispersion polymerization, which makes it difficult to stir the reaction mixture. The weight average molecular weight of polyalkyl (meth)acrylate as the polymer dispersant in dispersion polymerization is more preferably no less than 300,000 and preferably no more than 500,000.

(Polymerization Conditions)

The concentration of the (b) defoaming agent monomer (concentration of all the monomers in total when at least two monomers are used) in the reaction mixture when dispersion polymerization initiates is preferably no less than 5 mass %, and more preferably no less than 7 mass %; and preferably no more than 50 mass %, more preferably no more than 30 mass %, and further preferably no more than 20 mass %, on the basis of the total mass of the reaction mixture (100 mass %). The monomer concentration of less than 5 mass % leads to a significantly decreased polymerization rate, and thus a decreased conversion ratio of monomer to polymer. The monomer concentration of more than 50 mass % leads to an increased average particle size of the obtained defoaming agent fine particles.

The concentration of the (c1) polymer dispersant in dispersion polymerization is preferably no less than 0.1 mass %, and more preferably no less than 0.15 mass %; and preferably no more than 20 mass %, on the basis of the total mass of the reaction mixture (100 mass %). The concentration of the polymer dispersant of less than 0-1 mass % leads to an increased average particle size of the defoaming agent fine particles. The concentration of the polymer dispersant of more man 20 mass % leads to decreased solubility of the monomer, or to significantly increased viscosity of the polymerization solution, which makes it difficult to stir the reaction mixture.

Reaction temperature in dispersion polymerization can be suitably selected by the skilled person according to the used combination of the polymerization solvent, the defoaming agent monomer, the radical initiator, and the polymer dispersant, and the concentrations of the defoaming agent monomer and the polymer dispersant.

Any radical polymerization initiator soluble in the dispersion polymerization system at the polymerization temperature can be used without any limitation as a radical polymerization initiator for dispersion polymerization. Examples thereof include initiators such as organic peroxide initiators and azo compounds. The amount of the radical initiator is preferably no less than 0.1 parts by mass, and more preferably no less than 1 parts by mass; and preferably no more than 10 parts by mass, on the basis of 100 parts by mass of the used monomer. The amount of the radical initiator of less than 0.1 parts by mass on the basis of 100 parts by mass of the defoaming agent monomer leads to a decreased conversion ratio of monomer to polymer, which is thus unfavorable. The amount of the radical initiator of more than 10 parts by mass on the basis of 100 parts by mass of the defoaming agent monomer leads to deteriorated defoaming performance due to residue of the radical initiator, which is thus unfavorable.

In the (A1) first defoaming agent obtainable by dispersion polymerization (hereinafter may be simply referred to as "defoaming agent (A1)"), the defoaming agent polymer is in the form of fine particles as a result of dispersion polymerization, which makes it possible to suppress deterioration of defoaming performance due to segregation and precipitation of the defoaming agent particles. The average particle size of the defoaming agent particles obtained by dispersion polymerization (average particle size obtained by dynamic light scattering and cumulant analysis) is preferably no more than 10 µm, more preferably no more than 5 µm, and especially preferably no more than 2 µm; and preferably no less than 0.05 µm, more preferably no less than 0.1 µm, and especially preferably no less than 0.3 µm. The average particle size of the defoaming agent particles of more than 10 µm leads to significant segregation and precipitation of the defoaming agent, and thus to deteriorated defoaming performance. Dispersion polymerization makes it easy to have the average particle size of the defoaming agent particles of no more than 10 µm.

<(A2) First Defoaming Agent Obtainable by Solution Polymerization>

In another embodiment, the first defoaming agent is obtainable by solution polymerization. In solution polymerization, a polymer after completion of polymerization reaction remains dissolved in the solvent. Solution radical polymerization is preferable as solution polymerization.

((a) Polymerization Solvent)

As the polymerization solvent in solution polymerization, any solvent which can dissolve the (b) defoaming agent monomer and the polymer formed by polymerization of the defoaming agent monomer may be used without particular limitation.

Preferred examples of the polymerization solvent in solution polymerization include: aliphatic hydrocarbons (such as hexane, heptanes, octane, decane, cyclohexane, and methylcyclohexane), aromatic hydrocarbons (such as benzene, toluene, and xylene), ketones (such as acetone, methyl ethyl ketone, and methyl isobutyl ketone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve and dioxane), halogenated hydrocarbons (such as tetrachloromethane, chloroform, fluorothene (1,1,1-trifluoroethane), perchloroethylene, ethylene dichloride, dichloromethane, dichloroethane, trichloroethane, tetrachloroethane, chlorobenzene, dichlorobenzene, chrorofluoromethanes (the substitution numbers of chorine atom(s) and fluorine atom(s) may be any of 1 to 4 respectively, as long as the total number thereof is no more than 4), chlorofluoroethanes (the substitution numbers of chorine atom(s) and fluorine atom(s) may be any of 1 to 6 respectively, as long as the total number thereof is no more than 6, and the chorine atom(s) and the fluorine atom(s) may be in any position)), aliphatic alcohols (such as butanol, 2-ethylhexanol, and lauryl alcohol), and mineral oils. One polymerization solvent may be used alone, or two or more polymerization solvents may be used in combination.

((c) Coexisting Polymer)

Examples of polymers that can be used as the coexisting polymer in solution polymerization include: non-dispersant polyalkyl (meth)acrylate; dispersant polyalkyl (meth)acrylate having a polar group such as hydroxy group, amino group, or amide group in its side chain (the polar group may be introduced by random polymerization or block polymerization); comb-shaped polyalkyl (meth)acrylate having polyisobutylene in its side chain, or having a hydrogenated product of polybutadiene or polyisoprene in its side chain; star-shaped polyalkyl (meth)acrylate having a core moiety, and three or more arm moieties (branch moieties) bonded to the core moiety; olefin copolymer; hydrogenated product of styrene-diene copolymer; hydrogenated product of polyisoprene; polyisobutylene; maleated polyisobutylene; imidated product of maleated polyisobutylene; hydrogenated polybutadiene; oil-soluble polyester; rubber).

Among them, polyalkyl (meth)acrylate can be preferably used as the component (c) in solution polymerization. Specifically preferred examples of polyalkyl (meth)acrylate include polyalkyl (meth)acrylate having $C_{1-30}$ linear or branched alkyl groups. Polyalkyl (meth)acrylate may be of dispersant type, and may be of non-dispersant type. Polyalkyl (meth)acrylate may be a linear polymer, a comb-shaped polymer, or a star-shaped polymer.

The weight average molecular weight of the component (c) in solution polymerization is preferably 10,000 to 500,000, and more preferably no less than 30,000; and preferably no more than 500,000. The weight average molecular weight of the component (c) of less than 10,000 makes it difficult to improve durability of the obtained defoaming agent polymer against centrifugal effect. The weight average molecular weight of the component of more than 500,000 leads to too high viscosity of the solution during polymerization, which makes it difficult to stir the reaction mixture.

(Polymerization Conditions)

The concentration of the component (b) (concentration of all monomers in total when at least two monomers are used) in the reaction mixture when solution polymerization initiates is preferably no less than 5 mass %, and more preferably no less than 7 mass %; and preferably no more than 50 mass %, more preferably no more than 30 mass %, and further preferably no more than 20 mass %, on the basis of the total mass of the reaction mixture (100 mass %). The monomer concentration of less than 5 mass % leads to a significantly decreased polymerization rate, and thus to a decreased conversion ratio of monomer to polymer. The monomer concentration of more than 50 mass % makes the obtained defoaming agent polymer less easy to be finely dispersed.

The concentration of the component (c) in solution polymerization is preferably no less than 0.1 mass %, and more preferably no less than 0.15 mass %; and preferably no more than 20 mass %, on the basis of the total mass of the reaction mixture (100 mass %). The concentration of the component (c) of less than 0.1 mass % makes the obtained defoaming agent polymer less easy to be finely dispersed. The concentration of the component (c) of more than 20 mass % leads to decreased solubility of the monomer, or to significantly increased viscosity of the polymerization solution, which makes it difficult to stir the polymerization solution.

Reaction temperature in solution polymerization can be suitably selected by the skilled person according to the used combination of the polymerization solvent, the component (b), the component (c), and the radical initiator, and the concentrations of the component (b) and the component (c).

Any radical polymerization initiator soluble in the reaction solution at the polymerization temperature can be used without any limitation as a radical polymerization initiator for solution polymerization. Examples thereof include initiators such as organic peroxide initiators and azo compounds. The amount of the radical initiator is preferably no less than 0.1 parts by mass, and more preferably no less than 1 parts by mass; and preferably no more than 10 parts by mass, on the basis of 100 parts by mass of the used monomer. The amount of adding the radical initiator of less than 0.1 parts by mass on the basis of 100 parts by mass of the defoaming agent monomer leads to a decreased conversion ratio of monomer to polymer, which is thus unfavorable. The amount of the radical initiator of more than 10 parts by mass on the basis of 100 parts by mass of the defoaming agent monomer leads to deteriorated defoaming performance due to residue of the radical initiator, which is thus unfavorable.

The first defoaming agent (A2) (hereinafter may be simply referred to as "defoaming agent (A2)") obtainable by solution polymerization has not only improved fine dispersibility of the defoaming agent (A2) itself, but also an ability to improve fine dispersibility of the second defoaming agent described later, as a result of solution polymerization under the coexistence of the component (c). Thus, defoaming agent polymers can be easily finely dispersed in a lubricating oil composition even when the defoaming agent (A2) and the second defoaming agent are incorporating into the lubricating oil composition in the same manner as conventional defoaming agents. Further, the defoaming agent polymers remain finely dispersed in the lubricating oil composition even after a long term has passed, or after the lubricating oil composition is subjected to high centrifugal effect. Therefore, deterioration of defoaming performance due to segregation and precipitation of the defoaming agents can be suppressed by incorporating the defoaming agent (A2) along with the second defoaming agent in the lubricating oil composition.

Fine dispersibility of the defoaming agent (A2) can be evaluated by the average particle size of the defoaming agent particles in a dispersion comprising only the defoaming agent (A2) as a defoaming agent. The average particle size (average particle size obtained by dynamic light scattering and cumulant analysis) of the defoaming agent particles in a dispersion (at 25° C.) obtained by adding 1 mL of a solution after solution polymerization, which comprises the defoaming agent (A2), to 10 mL of a mineral oil, followed by sufficient stirring, to make the defoaming agent (A2) finely dispersed is preferably no more than 10 µm, more preferably no more than 5 µm, and especially preferably no more than 2 µm; and preferably no less than 0.05 µm, more preferably no less than 0.1 µm, and especially preferably no less than 0.3 µm. For example, YUBASE™ 4 manufactured by SK Lubricants Co., Ltd. (kinematic viscosity (100° C.): 42 mm$^2$/s, kinematic viscosity (40° C.); 19.4 mm$^2$/s, viscosity index: 125) is preferably used as the mineral oil for measurement of the average particle size. Preferably, the above described stirring can be carried out in a 100 mL beaker using a columnar magnetic stir bar made from PTFE of 8 mm in diameter×30 mm in length at ambient temperature at 200 rpm for 30 minutes. For example, a dynamic light scattering measurement device, Photal ELSZ-0 (manufactured by Otsuka Electronics Co., Ltd.) can be preferably used for measurement of the average particle size by dynamic light scattering. A defoaming agent such that the average particle size of defoaming agent particles in the dispersion cannot be made no more than 10 µm even after sufficient stirring, cause significant segregation and precipitation of the defoaming agent, and shows deteriorated defoaming performance. The defoaming agent (A2) makes it easy to obtain a dispersion in which the average particle size of the defoaming agent particles is no more than 10 µm, and no special operation other than stirring is necessary for obtaining such a dispersion.

(Content)

The content of the first defoaming agent in the lubricating oil composition of the present invention (the total content when two or more first defoaming agents are used in combination) is preferably no less than 1 mass ppm, and more preferably no less than 5 mass ppm; and preferably no more than 100 mass ppm, and more preferably no more than 50 mass ppm, in terms of silicon on the basis of the total mass of the composition. The content of the first defoaming agent of this lower limit or more makes it possible to enhance defoaming effect. The content thereof of this upper limit or below makes it easy to suppress deterioration of lifetime of the defoaming agent due to precipitation of defoaming agents.

((B) Second Defoaming Agent)

The second defoaming agent is a silicone defoaming agent which has a polysiloxane structure and does not fall under the first defoaming agent. As the second defoaming agent, one silicone defoaming agent having a linear or branched polysiloxane structure, the polysiloxane structure comprising a repeating unit represented by the following general formula (10) and having a polymerization degree of 300 to 3000 may be used alone, or two or more of the silicone defoaming agents may be used in combination. The polymerization degree of the polysiloxane structure is preferably no less than 500, and more preferably no less than 1,000; and preferably no more than 3,000. The polymerization degree of the polysiloxane structure in the second defoaming agent of no less than 300 makes it possible to improve defoaming performance. The polymerization degree thereof of no more than 3000 makes it possible to reduce viscosity and improve dispersibility, which leads to longer lifetime of the defoaming agent.

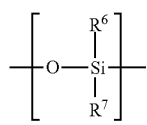

(10)

wherein in the formula (10), $R^6$ and $R^7$ are each independently a $C_{1-18}$ organic group or combination of two or more $C_{1-18}$ organic groups.

The polysiloxane structure in the second defoaming agent may be linear or branched. The linear polysiloxane structure for the second defoaming agent means the structure represented by the following general formula (11):

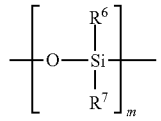

(11)

In the general formula (11), $R^6$ and $R^7$ are as defined above, and m represents the polymerization degree.

The branched polysiloxane structure in the second defoaming agent is obtainable by replacing $R^6$ and/or $R^7$ on the Si atom in one or more repeating units represented by the general formula (11) with a polysiloxane side chain comprising the repeating unit represented by the general formula (10). In the branched polysiloxane structure, the polysiloxane side chain may further comprise one or more branches. The polymerization degree of the polysiloxane structure equals to the total number of Si atoms thereof.

In the general formulae (10) and (11), examples of organic groups having 1 to 18 carbons include: substituted or unsubstituted alkyl groups, substituted or unsubstituted phenyl groups, fluoroalkyl groups, and polyether groups. Examples of substituents in substituted alkyl groups and substituted phenyl groups include hydroxy group, amino group, ether bond, and ester bond. The carbon numbers of $R^6$ and $R^7$ are 1 to 18, 1 to 12 in one embodiment, and 1 to 6 in another embodiment. Preferred examples of the organic groups include: methyl group, phenyl group, and fluoroalkyl groups. Among them, methyl group or a fluoroalkyl group can be especially preferably employed.

A chain end of the polysiloxane structure in the second defoaming agent may be bonded with, for example, the same group as $R^6$ or $R^7$ in the formulae (10) and (11), a $C_{1-12}$ hydrocarbyl group, a $C_{1-12}$ monovalent organic group having one or more functional groups (such as hydroxy group, amino groups, ether bond, ester bond, and amide bond), or a hydroxy group.

(Content)

The content of the second defoaming agent in the lubricating oil composition of the present invention is preferably no less than 1 mass ppm, and more preferably no less than 5 mass ppm; and preferably no more than 150 mass ppm, and more preferably no more than 100 mass ppm, in terms of silicon on the basis of the total mass of the composition. The content of the second defoaming agent of this lower limit or more makes it possible to enhance defoaming effect. The content thereof of this upper limit or below makes it easy to suppress deterioration of lifetime of the defoaming agent due to precipitation of defoaming agents.

The total content of the first and second defoaming agents in the lubricating oil composition of the present invention is preferably no less than 5 mass ppm, and more preferably no less than 10 mass %; and preferably no more than 200 mass ppm, and more preferably no more than 150 mass ppm, in terms of silicon on the basis of the total mass of the composition. The total content of the first and second defoaming agents of this lower limit or more makes it possible to enhance defoaming effect. The total content thereof of this upper limit or below makes it easy to suppress deterioration of lifetime of the defoaming agents due to precipitation of defoaming agents.

The ratio (A/B) of the content of the (A) first defoaming agent in terms of silicon to the content of the (B) second defoaming agent in terms of silicon is preferably no less than 0.01, and more preferably no less than 0.1; an preferably no more than 100, more preferably no more than 10, and especially preferably no more than 2. The ratio of the content of the first defoaming agent to that of the second defoaming agent of this lower limit or over makes it easy to suppress deterioration of lifetime of the defoaming agents due to precipitation of the defoaming agents. The ratio thereof of this upper limit or below makes it possible to enhance defoaming effect.

(Other Additives)

The lubricating oil composition of the present invention may further contain at least one additive selected from (C) ashless dispersants, (D) antioxidants, (E) friction modifiers, (F) anti-wear agents or extreme-pressure agents, (G) metallic detergents, (H) viscosity index improvers or pour point depressants, (I) corrosion inhibitors, (J) anti-rust agents, (K) metal deactivators, (L) demulsifiers, (M) defoaming agents other than the first and second defoaming agents, and (N) coloring agents, in addition to the above described lubricant base oil and the first and second defoaming agents.

For example, known ashless dispersants such as succinimide ashless dispersants can be used as (C) ashless dispersants. Examples thereof include: polybutenylsuccinimides having a polybutenyl group, the polybutenyl group having a number average molecular weight of 900 to 3500; polybutenylbenzylamines; polybutenylamines; and derivatives thereof (such as boric acid-modified products).

When the lubricating oil composition of the present invention contains ashless dispersants, the content thereof is normally no less man 0.01 mass %, and preferably no less than 0.1 mass %; and normally no more than 20 mass %, and preferably no more than 10 mass %, on the basis of the total mass of the lubricating oil composition, that is, to the total mass of the lubricating oil composition as 100 mass %.

Known antioxidants such as phenol antioxidants and amine antioxidants can be used as (D) antioxidants. Examples thereof include amine antioxidants such as alkylated diphenylamines, phenyl-α-naphtylamine, alkylated α-naphthylamines, and phenol antioxidants such as 2,6-di-tert-butyl-4-methylphenol, 4,4'-methlenebis(2,6-di-tert-butylphenol).

When the lubricating oil composition of the present invention contains antioxidants, the content thereof is normally no more than 5.0 mass %, and preferably no more than 3.0 mass %; and preferably no less than 0.1 mass %, and more preferably no less than 0.5 mass %, on the basis of the total mass of the lubricating oil composition.

Known friction modifiers can be used as (E) friction modifiers. Examples include: aliphatic acid esters; aliphatic acid amides; phosphorus compounds such as phosphate esters, phosphite esters, and thiophosphate esters; organic molybdenum compounds such as MoDTP and MoDTC; organic zinc compounds such as ZnDTP; organic boron compounds such as alkylmercaptyl borates; graphite; molybdenum disulfide; antimony sulfide; boron compounds; and polytetrafluoroethylene.

When the lubricating oil composition of the present invention contains friction modifiers, the content thereof is normally 0.05 to 5 mass % on the basis of the total mass of the lubricating oil composition.

Known anti-wear agents or extreme-pressure agents can be used as (F) anti-wear agents or extreme-pressure agents. Examples thereof include: metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition of the present invention contains anti-wear agents or extreme-pressure agents, the content thereof is normally 0.05 to 5 mass % on the basis of the total mass of the lubricating oil composition.

Known metallic detergents can be used as (G) metallic detergents. Examples thereof include alkali metal and alkaline earth metal sulfonates, alkali metal and alkaline earth metal phenates, alkali metal and alkaline earth metal salicylates, and combinations thereof. These metallic detergents may be overbased. In this description, "alkaline earth metal" encompasses Mg.

When the lubricating oil composition of the present invention contains metallic detergents, the content thereof is not restricted. When the composition is for automobile transmissions, the content thereof is normally 0.005 to 1.0 mass % in terms of metal elements on the basis of the total mass of the lubricating oil composition. When the composition is for internal combustion engines, the content thereof is normally 0.01 to 5.0 mass % in terms of metal elements on the basis of the total mass of the lubricating oil composition. When the composition is for automobile transaxle units, the content thereof is normally 0.001 to 0.1 mass % in terms of metal elements on the basis of the total mass of the lubricating oil composition.

Known viscosity index improvers or pour point depressants can be used as (H) viscosity index improvers or pour point depressants. Examples of viscosity index improvers include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutyrene and hydrogen adducts thereof; hydrogen adducts of styrene-diene copolymers; styrene-maleic anhydride copolymer; and polyalkylstyrenes. When the lubricating oil composition of the present invention contains viscosity index improvers or pour point depressants, the content thereof is normally 0.1 to 20 mass % on the basis of the total mass of the lubricating oil composition.

Examples of pour point depressants include poly methacrylate polymers. When the lubricating oil composition of the present invention contains pour point depressants, the content thereof is normally 0.01 to 2 mass % on the basis of the total mass of the lubricating oil composition.

It is noted that while the (A) first defoaming agent is obtainable by polymerizing the defoaming agent monomer (component (b)) in the polymerization solvent under the coexistence of the polymer (component (c)) soluble in the polymerization solvent, the inventors have found that the component (c) used in polymerization cannot be separated from the first defoaming agent after polymerization.

For example, known corrosion inhibitors such as benzotriazole compounds, tolyltriazole compounds, thiadiazole compounds, and imidazole compounds can be used as (I) corrosion inhibitors. When the lubricating oil composition of the present invention contains corrosion inhibitors, the content thereof is normally 0.005 to 5 mass % on the basis of the total mass of the lubricating oil composition.

For example, known anti-rust agents such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, fatty amines, oxidized paraffins, and alkyl polyoxyethylene ethers can be used as (J) anti-rust agents. When the lubricating oil composition of the present invention contains anti-rust agents, the content thereof is normally 0.005 to 5 mass % on the basis of the total mass of the lubricating oil composition.

For example, known metal deactivators such as imidazoline, pyrimidine derivatives, alkylthiadiazoles, mercaptobenzothiazole, benzotriazole and derivatives thereof, 1,3,4-thiadiazole polysulides, 1,3,4-thiadiazolyl-2,5-bisdialkyldithiocarbamates, 2-(alkyldithio)benzimidazoles, and β-(o-carboxybenzylthio)propionitrile can be used as (K) metal deactivators. When the lubricating oil composition of the present invention contains these metal deactivators, the content thereof is normally 0.005 to 1 mass % on the basis of the total mass of the lubricating oil composition.

For example, known demulsifiers such as polyalkylene glycol-based nonionic surfactants can be used as (L) demulsifiers. When the lubricating oil composition of the present invention contains demulsifiers, the content thereof is normally 0.005 to 5 mass % on the basis of the total mass of the lubricating oil composition.

For example, known defoaming agents such as fluorosilicones, and fluoroalkyl ethers can be used as (M) defoaming agents other than the first and second defoaming agents. When the lubricating oil composition of the present invention contains these defoaming agents, the content thereof is normally 0.0001 to 0.1 mass % on the basis of the total mass of the lubricating oil composition.

For example, known coloring agents such as azo compounds can be used as (N) coloring agents.

The lubricating oil composition of the present invention, owing to improved storage stability of the defoaming agents, can suppress segregation and precipitation of the defoaming agents even during long-term storage, and thereby suppress deterioration of defoaming performance. The lubricating oil imposition of the present invention can maintain good defoaming performance for a long term even under such lubricating conditions that a lubricating oil is subjected to high centrifugal effect. As a result, foaming of the lubricating oil can be suppressed for a long term, which makes it also possible to suppress promoted deterioration of the lubricating oil failure to control hydraulic pressure, wear and seizure, etc. due to foaming, for a long term.

(Production)

The lubricating oil composition of the present invention can produced by adding the (A) first defoaming agent and the (B) second defoaming agent to the lubricant base oil, or a composition containing the lubricant base oil and at least one additive (hereinafter may be referred to as "base oil, etc."). Other additives may be further added after addition of the (A) first defoaming agent and the (B) second defoaming agent.

An order of adding the (A) first defoaming agent and the (B) second defoaming agent is not specifically limited. One may add the (B) second defoaming agent after adding the (A) first defoaming agent. One may add the (A) first defoaming agent after adding the (B) second defoaming agent. One may add the (A) first defoaming agent and the (B) second defoaming agent at the same time. Preferably, the (B) second defoaming agent is added after adding the (A) first defoaming agent.

A method for adding the (A) first defoaming agent and the (8) second defoaming agent to the base oil, etc. is not specifically limited. For ample, (α) one may simply add the defoaming agents to the base oil, etc. and make the defoaming agents dispersed; or (β) one may once dissolve or finely disperse the defoaming agents in a diluting solvent (such as kerosene), to prepare a dilution, and thereafter add the dilution to the base oil, etc.

When (α) simply adding the defoaming agents to the base oil, etc. and making the defoaming agents dispersed, (α1) one may simply add the defoaming agents to the base oil, etc., and stir the resultant mixture; or (α2) one may take out part of the base oil, etc., add a proper amount of the defoaming agents to the taken base oil, etc., stir the resultant mixture (for example, by a mixer), to make the defoaming agents finely dispersed, and add the obtained fine dispersion to the original base oil, etc., and stir the resultant mixture.

In the method (α2), the amount of the defoaming agents that are added to the part of the base oil, etc. which is taken out, is preferably no more than 5 mass %, and more preferably no more than 1 mass %, on the basis of the total mass of the part of the base oil, etc. which is taken out and the defoaming agents that are added (100 mass %).

When (β) once dissolving or finely dispersing the defoaming agents in a diluting solvent to prepare a dilution, and thereafter adding the dilution to the base oil, etc., (β1) one may separately prepare a dilution of the first defoaming agent, and a dilution of the second defoaming agent, and add them to the base oil, etc.; or (β2) one may prepare a mixed dilution (defoaming agent composition) of the first and second defoaming agents, and add the mixed dilution to the base oil, etc. The method (β2) is preferable as described later as the method for defoaming a lubricating oil of the present invention.

(Use)

The lubricating oil composition of the present invention can be widely used for the purpose of lubrication that demands defoaming performance especially in view of the above described functions and effect. For example, the lubricating oil composition of the present invention can be preferably used as internal combustion engine oil, hydraulic oil, industrial gear oil, turbine oil, compressor oil, transmission oil, and automobile axle unit oil, and among them, especially preferably used as automobile engine oil, automobile transmission oil, or automobile axle unit oil.

<2. Method for Defoaming Lubricating Oil>

The method for defoaming a lubricating oil of the present invention comprises the steps of; (i) dissolving or finely dispersing the (A) first defoaming agent and the (B) second defoaming agent in a diluting solvent, to obtain a dilution (defoaming agent composition); and (ii) adding the dilution obtained in the step (i) to a lubricating oil.

(Step (i))

The step (i) is a step of dissolving or finely dispersing the (A) first defoaming agent and the (B) second defoaming agent in a diluting solvent to obtain a dilution (defoaming agent composition). The (A) first defoaming agent and the (B) second defoaming agent have been already described in detail Any solvent that can dissolve or finely disperse the first and second defoaming agents can be used as the diluting solvent. The diluting solvent is preferably a solvent soluble in the lubricating oil to which the dilution is added in the step (ii). Preferable examples of the diluting solvent include: hydrocarbon solvents having 6 or more carbons, mineral oils, synthetic oils, ester oils, aliphatic ethers having 4 or more carbons, esters of an aliphatic monocarboxylic add having 2 or more carbons and a monoalcohol having to 5 carbons, aliphatic ketones having 3 or more carbons, aliphatic alcohols having 4 or more carbons, and halogenated hydrocarbons, and combination thereof. One solvent may be used alone, and at least two solvents may be used in combination, as the diluting solvent.

Preferred examples of the hydrocarbon solvent having 6 or more carbons include: benzene, toluene, xylene, cyclohexane, n-hexane, n-heptane, n-decane, octane, and methylcyclohexane. The carbon number is preferably no more than 16, more preferably no more than 13, and further preferably no more than 10. Among them, benzene, toluene, xylene, cyclohexane, n-hexane, and n-heptane can be especially preferably used.

Preferred examples of the mineral oil, synthetic oil, and ester oil include lamp oil, solvent naphtha, industrial gasoline, mineral spirit, and kerosene, in addition to mineral base oils, synthetic base oils, and ester base oils described above concerning the lubricant base oil.

Preferred examples of the aliphatic ether having 4 or more carbons include: diethyl ether, diisopropyl ether, tert-butyl methyl ether, dihexyl ether, dimethyl cellosolve, and dioxane. The carbon number is preferably no more than 12. Among them, diethyl ether, diisopropyl ether, and dihexyl ether can be especially preferably used.

Preferred examples of the ester of an aliphatic monocarboxylic acid having 2 or more carbons and a monoalcohol having 1 to 5 carbons include: ethyl acetate, isopropyl acetate, butyl acetate, isobutyl acetate, amyl acetate, isopropyl laurate, isopropyl palmitate, and isopropyl myristate.

The carbon number of an aliphatic monocarboxylic acid residue is preferably no more than 16. The carbon number of an alcohol residue is preferably 2 to 5. Among them, ethyl acetate, butyl acetate, isopropyl laurate, isopropyl palmitate, and isopropyl myristate can be especially preferably used.

Preferred examples of the aliphatic ketone having 3 or more carbons include: methyl ethyl ketone, methyl isobutyl ketone, and acetone. The carbon number is preferably no more than 10. Among them, methyl ethyl ketone and methyl isobutyl ketone can be especially preferably used.

Preferred examples of the aliphatic alcohol having 4 or more carbons include: lauryl alcohol, butanol, and 2-ethylhexanol. The carbon number is preferably no more than 18. Among them, lauryl alcohol can be especially preferably used.

Preferred examples of the halogenated hydrocarbon include: carbon tetrachloride, chloroform, fluorothene (1,1,1-trifluoroethane), perchloroethylene, trichloroethylene, tetrachloroethane, dichloromethane, ethylene dichloride, chlorobenzene, chlorofluoromethanes (the substitution numbers of chlorine atom(s) and fluorine atom(s) may be any of at least 1 respectively, as long as the total number thereof is no more than 4), chlorofluoroethanes (the substitution numbers of chlorine atom(s) and fluorine atom(s) may be any of at least 1 respectively, as long as the total number thereof is no more than 6, and the chlorine atom(s) and the fluorine atom(s) may be in any position). The carbon number is preferably no less than 1, and preferably no more than 6.

When the first and second defoaming agents are dissolved or finely dispersed in the diluting solvent in the dilution (defoaming agent composition), phase segregation or precipitation does not occur in the dilution for a week or more, preferably a month or more, even when the dilution is left standing at 25° C. If at least one of the first and second defoaming agents is not dissolved or finely dispersed in the diluting solvent in the dilution, phase segregation or precipitation occurs within a shorter period (for example, 3 days). Thus, it is possible to determine whether or not the first and second defoaming agents are dissolved or finely dispersed in the diluting solvent, by whether or not phase segregation or precipitation does not occur for a week or more when the dilution is left standing at 25° C. That is, if phase segregation or precipitation does not occur for a week or more when the dilution is left standing at 25° C., it can be determined that the first and second defoaming agents are dissolved or finely dispersed in the diluting solvent.

The total concentration of the first and second defoaming agents in the dilution (defoaming agent composition) is no less than 500 mass ppm, preferably no less than 1,000 mass ppm, and more preferably no less than 3,000 mass ppm; and no more than 50,000 mass ppm, and preferably no more than 40,000 mass ppm, in terms of silicon on the basis of the total mass of the dilution. The total concentration of the first and second defoaming agents in the dilution of this lower limit or over makes it possible to suppress a flash point of the lubricating oil from decreasing due to the dilution. The total concentration of the defoaming agents in the dilution of this upper limit or below makes it easy to suppress deterioration of lifetime of the defoaming agents due to precipitation of the defoaming agents.

(Step (ii))

The step (ii) is a step of adding the dilution (defoaming agent composition) obtained in the step (i) to a lubricating oil. The amount of the dilution to be added to the lubricating oil can be such that the above described preferred concentration of the defoaming agents in the lubricating oil composition of the present invention is realized.

The lubricating oil to which the dilution (defoaming agent composition) is added in the step (ii) may contain additives other than the first and second defoaming agents in advance, in addition to the base oil. One may also add the dilution to a lubricating oil consisting of the base oil and not comprising additives other than the first and second defoaming agents in the step (ii), and thereafter add other additives.

When adding the dilution to the lubricating oil (defoaming agent composition), one may add the dilution to the lubricating oil little by little successively (for example, dropwise) while mixing, or one may add a desired amount of the dilution to the lubricating oil in one portion. In view of more finely dispersing the defoaming agents in the lubricating oil composition, it is preferable to successively add the dilution to the lubricating oil while mixing.

The method for defoaming a lubricating oil of the present invention makes it possible to more effectively suppress deterioration of defoaming performance due to segregation and precipitation of the defoaming agents, compared to the case of separately adding the first defoaming agent and the second defoaming agent to the lubricating oil.

EXAMPLES

Hereinafter the present invention will be more specifically described based on the examples and comparative examples. The following examples are intended to show examples of the present invention, but not intended to limit the present invention.

Preparation Examples 1 to 3

(Measurement of Average Particle Size of Defoaming Agent (A1))

In the following preparation examples, the average particle size of the defoaming agent (A1) was calculated by cumulant analysis based on the result of dynamic light scattering measurement of a sample (25° C.) prepared by diluting a dispersion polymerization liquid with a mineral oil. The dynamic light scattering measurement was carried out using a dynamic light scattering measurement device, Photal ELSZ-0 (manufactured by Otsuka Electronics Co., Ltd.).

Preparation Example 1

A defoaming agent A that fell under the first defoaming agent (A1) was prepared by the following procedures:

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of a mineral oil (kinematic viscosity at 40° C.: 8.9 mm$^2$/s) as a polymerization solvent, 3 parts by mass of KF2012 (methacrylate-modified polydimethylsiloxane; manufactured by Shin-Etsu Chemical Co., Ltd.; functional group equivalent 4,600 g/mol) and 0.15 parts by mass of ethylene glycol dimethacrylate as defoaming agent monomers, and 1.5 parts by mass of polyalkyl methacrylate (weight average molecular weight Mw=320,000) as a polymer dispersant were introduced, and stirred to be a uniform solution, and thereafter the reaction system was vacuum-degassed and purged with nitrogen five times using a diaphragm pump. Under a nitrogen flow, 0.15 parts by mass of PEROCTA O (1,1,3,3-tetramethylbutyl peroxy-2-ethylhexanoate; a peroxide radical polymerization initiator; manufactured by NOF CORPORATION) as a radical polymerization initiator was introduced from the sample inlet, and the resultant mixture was stirred for 8 hours at polymerization temperature of 70° C. under a nitrogen atmosphere to conduct a polymerization reaction, to afford a fine dispersion of a defoaming agent polymer. The average particle size of the obtained defoaming agent polymer was 0.5 μm.

Preparation Example 2

A defoaming agent B that fell under the first defoaming agent (A1) was prepared in the same way as the preparation example 1 except that the defoaming agent monomers were changed to 3 parts by mass of X22-2426 (methacrylate-modified polydimethylsiloxane; manufactured by Shin-Etsu Chemical Co., Ltd.; functional group equivalent 12,000 g/mol) and 0.15 parts by mass of ethylene glycol dimethacrylate, and the amount of the polymer dispersant was changed to 0.06 parts by mass. The average particle size of the obtained defoaming agent polymer was 0.5 μm.

Preparation Example 3

A defoaming agent C that fell under the first defoaming agent (A1) was prepared by dispersion polymerization, by the following procedures:
To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of a mineral oil (kinematic viscosity at 40° C.: 8.9 mm²/s) as a polymerization solvent, 1.5 parts by mass of polyalkyl methacrylate (weight average molecular weight Mw=320,000) as a polymer dispersant, and 2.4 parts by mass of KF2012 (methacrylate-modified polydimethylsiloxane; manufactured by Shin-Etsu Chemical Co., Ltd.; functional group equivalent 4,600 g/mol) and 0.6 parts by mass of 1H,1H,2H,2H-tridecafluoro-n-octyl methacrylate (manufactured by Tokyo Chemical Industry Co., Ltd.) as defoaming agent monomers were introduced, and stirred to be a uniform solution, and thereafter the reaction system was vacuum-degassed and purged with nitrogen five times using a diaphragm pump. Under a nitrogen flow, 0.15 parts by mass of PEROCTA O (1,1,3,3-tetramethylbutyl peroxy-2-ethylhexanoate; a peroxide radical polymerization initiator; manufactured by NOF CORPORATION) as a radical polymerization initiator was introduced from the sample inlet, and the resultant mixture was stirred for 8 hours at polymerization temperature of 70° C. under a nitrogen atmosphere to conduct a polymerization reaction, to afford a fine dispersion of a defoaming agent polymer. The average particle size of the obtained defoaming agent polymer was 0.8 μm.

Preparation Examples 4 to 6

(Measurement of Average Particle Size of Defoaming Agent (A2))
In the following preparation examples, the average particle size of the defoaming agent (A2) was calculated by cumulant analysis based on the result of dynamic light scattering measurement of a sample (25° C.) prepared by adding 1 mL of a solution comprising the defoaming agent after solution polymerization to 10 mL of a mineral oil, followed by sufficient stirring, thus making the defoaming agent finely dispersed. The dynamic light scattering measurement was carried out using a dynamic light scattering measurement device, Photal ELSZ-0 (manufactured by Otsuka Electronics Co., Ltd.). YUBASE™ 4 manufactured by SK Lubricants Co., Ltd. (kinematic viscosity (100° C.): 4.2 mm²/s, kinematic viscosity (40° C.): 19.4 mm²/s, viscosity index: 125) was used as the mineral oil. Stirring described above was conducted in a 100 mL beaker using a columnar magnetic stir bar made from PTFE (polytetrafluoroethylene) of 8 mm in diameter×30 mm in length at ambient temperature at 200 rpm for 30 minutes.

Preparation Example 4

A defoaming agent D that fell under the first defoaming agent (A2) was prepared by solution polymerization, by the following procedures:
To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of n-decane as the polymerization solvent, 3 parts by mass of KF2012 (methacrylate-modified polydimethylsiloxane; manufactured by Shin-Etsu Chemical Co., Ltd.; functional group equivalent 4,600 g/mol) and 0.15 parts by mass of ethylene glycol dimethacrylate as the defoaming agent monomers, and 1.5 parts by mass of polyalkyl methacrylate (weight average molecular weight Mw=450,000) as a coexisting polymer were introduced, and stirred to be a uniform solution, and thereafter the reaction system was vacuum-degassed and purged with nitrogen five times using a diaphragm pump. Under a nitrogen flow, 0.15 parts by mass of PEROCTA O (1,1,3,3-tetramethylbutyl peroxy-2-ethylhexanoate; a peroxide radical polymerization initiator; manufactured by NOF CORPORATION) as the radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent polymer. The average particle size of the defoaming agent particles in the dispersion measured by the above procedures was 0.5 μm.

Preparation Example 5

A defoaming agent E that fell under the first defoaming agent (A2) was prepared in the same way as the preparation example 4 by solution polymerization except that the defoaming agent monomers were changed to 3 parts by mass of X22-2426 (methacrylate-modified polydimethylsiloxane; manufactured by Shin-Etsu Chemical Co., Ltd.; functional group equivalent 12,000 g/mol) and 0.15 parts by mass of ethylene glycol dimethacrylate, and the amount of the coexisting polymer was changed to 0.06 parts by mass. The average particle size of the defoaming agent particles in the dispersion measured by the above procedures was 0.5 μm.

Preparation Example 6

A defoaming agent F that fell under the first defoaming agent (A2) was prepared by solution polymerization, by the following procedures:
To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of n-decane as the polymerization solvent, 1.5 parts by mass of polyalkyl methacrylate (weight average molecular weight Mw=450,000) as a coexisting polymer, and 2.4 parts by mass of KF2012 (methacrylate-modified polydimethylsiloxane; manufactured by Shin-Etsu Chemical Co., Ltd.; functional group equivalent 4,600 g/mol) and 0.6 parts by mass of 1H,1H,2H,2H-tridecafluoro-n-octyl methacrylate (manufactured by Tokyo Chemical Industry Co., Ltd.) as the defoaming agent monomers were introduced, and stirred to be a uniform solution, and thereafter the reaction system was vacuum-degassed and purged with nitrogen five times using a diaphragm pump. Under a nitrogen flow, 0.15 parts by mass of PEROCTA O (1,1,3,3-tetramethylbutyl peroxy-2-ethylhexanoate; a peroxide radical polymerization initiator; manufactured by NOF CORPORATION) as the radical polymerization initiator was introduced from the sample inlet, and the resultant mixture was stirred for 8 hours at polymerization temperature of 70° C. under a nitrogen atmosphere to conduct a polymerization reaction, to afford a solution of the defoaming agent polymer. The average particle size of the defoaming agent particles in the dispersion measured by the above procedures was 0.5 μm.

Preparation Example 7

A defoaming agent G that did not fall under the first defoaming agent was prepared by the following procedures:
To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of KF2012 (methacrylate-modified polydimethylsiloxane; manufactured by Shin-Etsu Chemical Co., Ltd.; functional group equivalent 4,600 g/mol), and 0.024 parts by mass of dodecyl mercaptan were introduced and stirred to be a uniform mixture, and thereafter the reaction system was vacuum-degassed and purged with nitrogen five times using a diaphragm pump. Under a nitrogen flow, 0.45 parts by mass of MAIB (dimethyl 2,2'-azobisisobutyrate; azo type initiator manufactured by Otsuka Chemical Co., Ltd.) as the radical polymerization initiator was introduced from the sample inlet, and the resultant mixture was stirred for 8 hours at polymerization temperature of 70° C. under a nitrogen atmosphere to conduct a polymerization reaction, to afford a comb-shaped polymer defoaming agent G. As a result of GPC analysis (standard material: polystyrene), the weight average molecular weight (Mw) of the obtained comb-shaped polymer defoaming agent G was 125,000, and the polydispersity index thereof (Mw/Mn) was 1.72.

Examples 1 to 38, and Comparative Examples 1 to 6

As shown in Tables 1 to 5, the lubricating oil compositions of the present invention (Examples 1 to 38), and lubricating oil compositions for comparison (Comparative Examples 1 to 6) were prepared. In Tables 1 to 5, "Si ppm" means mass ppm in terms of silicon.

TABLE 1

| | | | Examples | | | | |
|---|---|---|---|---|---|---|---|
| | | | 1 | 2 | 3 | 4 | 5 |
| Lubricating oil | Transmission oil (*1) | | Balance | Balance | Balance | Balance | Balance |
| Defoaming agent | (A1) Defoaming agent A | Si ppm | 10 | 10 | 6 | 1 | 10 |
| | (A1) Defoaming agent B | Si ppm | | | | | |
| | (A1) Defoaming agent C | Si ppm | | | | | |
| | (B) Defoaming agent H (*2) | Si ppm | 10 | 10 | 10 | 10 | 5 |
| | (B) Defoaming agent I (*3) | Si ppm | | | | | |
| | (B) Defoaming agent J (*4) | Si ppm | | | | | |
| Method for adding defoaming agents to lubricating oil (*5) | | | B | A | A | A | A |
| Diluting solvent | | | kerosene | kerosene | kerosene | kerosene | kerosene |
| Silicon content in mixed dilution | | Si ppm | — | 8000 | 8000 | 4000 | 6000 |
| Amount of foaming in homogenizer test | | | | | | | |
| Fresh oil | | mL | 40 | 40 | 40 | 40 | 40 |
| Supernatant after 3 h centrifugation | | mL | 40 | 40 | 40 | 40 | 40 |
| Silicon content in oil | | | | | | | |
| Fresh oil | | ppm | 20 | 20 | 15 | 11 | 15 |
| Supernatant after 3 h centrifugation | | ppm | 11 | 16 | 10 | 3 | 12 |

| | | | Examples | | | | |
|---|---|---|---|---|---|---|---|
| | | | 6 | 7 | 8 | 9 | 10 |
| Lubricating oil | Transmission oil (*1) | | Balance | Balance | Balance | Balance | Balance |
| Defoaming agent | (A1) Defoaming agent A | Si ppm | 10 | 10 | 1 | | |
| | (A1) Defoaming agent B | Si ppm | | | | 10 | 1 |
| | (A1) Defoaming agent C | Si ppm | | | | | |
| | (B) Defoaming agent H (*2) | Si ppm | 100 | | | 10 | 10 |
| | (B) Defoaming agent I (*3) | Si ppm | | 10 | 10 | | |
| | (B) Defoaming agent J (*4) | Si ppm | | | | | |
| Method for adding defoaming agents to lubricating oil (*5) | | | A | A | A | A | A |
| Diluting solvent | | | kerosene | kerosene | kerosene | kerosene | kerosene |
| Silicon content in mixed dilution | | Si ppm | 40000 | 8000 | 4000 | 8000 | 4000 |
| Amount of foaming in homogenizer test | | | | | | | |
| Fresh oil | | mL | 40 | 40 | 40 | 40 | 40 |
| Supernatant after 3 h centrifugation | | mL | 40 | 40 | 40 | 40 | 40 |

TABLE 1-continued

| | | | | | | |
|---|---|---|---|---|---|---|
| Silicon content in oil | | | | | | |
| Fresh oil | ppm | 110 | 20 | 11 | 20 | 11 |
| Supernatant after 3 h centrifugation | ppm | 45 | 15 | 3 | 16 | 3 |

(*1) Transmission oil obtained by removing defoaming agents from *ENEOS FINE AT FLUID* by JX Nippon Oil & Energy Corporation
(*2) KF-96 by Shin-Etsu Chemical Co., Ltd., viscosity: 50,000 cSt, dimethylsilicone defoaming agent
(*3) KF-96 by Shin-Etsu Chemical Co., Ltd., viscosity: 1,000,000 cSt, dimethylsilicone defoaming agent
(*4) FA-600 by Shin-Etsu Chemical Co., Ltd., viscosity: 10 cSt, fluorosilicone defoaming agent
(*5) Method for adding a plurality of defoaming agents to lubricating oil: A) diluting both defoaming agents in a solvent, to obtain a mixed dilution, and thereafter adding the the dilution to the lubrication oil. B) preparing solvent dilutions of defoaming agents individually, and thereafter adding each dilution to the lubricating oil.

TABLE 2

| | | | Examples | | | |
|---|---|---|---|---|---|---|
| | | | 11 | 12 | 13 | 14 |
| Lubricating oil | Transmission oil (*1) | | Balance | Balance | Balance | Balance |
| Defoaming agent | (A1) Defoaming agent A | Si ppm | | | | |
| | (A1) Defoaming agent B | Si ppm | | | | |
| | (A1) Defoaming agent C | Si ppm | 10 | 1 | 10 | 10 |
| | (B) Defoaming agent H (*2) | Si ppm | 10 | 10 | | |
| | (B) Defoaming agent I (*3) | Si ppm | | | 10 | 5 |
| | (B) Defoaming agent J (*4) | Si ppm | | | | |
| Method for adding defoaming agents to lubricating oil (*5) | | | A | A | A | A |
| Diluting solvent | | | kerosene | kerosene | kerosene | kerosene |
| Silicon content in mixed dilution | | Si ppm | 8000 | 4000 | 8000 | 6000 |
| Amount of foaming in homogenizer test | | | | | | |
| Fresh oil | | mL | 40 | 40 | 40 | 40 |
| Supernatant after 3 h centrifugation | | mL | 40 | 40 | 40 | 40 |
| Silicon content in oil | | | | | | |
| Fresh oil | | ppm | 20 | 11 | 20 | 15 |
| Supernatant after 3 h centrifugation | | ppm | 10 | 2 | 9 | 7 |

| | | | Examples | | | | |
|---|---|---|---|---|---|---|---|
| | | | 15 | 16 | 17 | 18 | 19 |
| Lubricating oil | Transmission oil (*1) | | Balance | Balance | Balance | Balance | Balance |
| Defoaming agent | (A1) Defoaming agent A | Si ppm | | | 10 | 10 | 10 |
| | (A1) Defoaming agent B | Si ppm | | | | | |
| | (A1) Defoaming agent C | Si ppm | 10 | 10 | | | |
| | (B) Defoaming agent H (*2) | Si ppm | | | | | |
| | (B) Defoaming agent I (*3) | Si ppm | | | | | |
| | (B) Defoaming agent J (*4) | Si ppm | 10 | 5 | 5 | 10 | 100 |
| Method for adding defoaming agents to lubricating oil (*5) | | | A | A | A | A | A |
| Diluting solvent | | | MEK | MEK | MEK | MEK | MEK |
| Silicon content in mixed dilution | | Si ppm | 8000 | 6000 | 6000 | 8000 | 40000 |
| Amount of foaming in homogenizer test | | | | | | | |
| Fresh oil | | mL | 40 | 40 | 40 | 40 | 40 |
| Supernatant after 3 h centrifugation | | mL | 40 | 40 | 40 | 40 | 40 |
| Silicon content in oil | | | | | | | |
| Fresh oil | | ppm | 20 | 15 | 15 | 20 | 110 |
| Supernatant after 3 h centrifugation | | ppm | 8 | 7 | 11 | 15 | 40 |

(*1) Transmission oil obtained by removing defoaming agents from *ENEOS FINE AT FLUID* by JX Nippon Oil & Energy Corporation
(*2) KF-96 by Shin-Etsu Chemical Co., Ltd., viscosity: 50,000 cSt, dimethylsilicone defoaming agent
(*3) KF-96 by Shin-Etsu Chemical Co., Ltd., viscosity: 1,000,000 cSt, dimethylsilicone defoaming agent
(*4) FA-600 by Shin-Etsu Chemical Co., Ltd., viscosity: 10 cSt, fluorosilicone defoaming agent
(*5) Method for adding plurality of defoaming agents to lubricating oil: A) diluting both defoaming agents in a solvent, to obtain a mixed dilution, and thereafter adding the the dilution to the lubrication oil. B) preparing solvent dilutions of defoaming agents individually, and thereafter adding each dilution to the lubricating oil.

TABLE 3

|  |  |  | Examples | | | | |
| --- | --- | --- | --- | --- | --- | --- | --- |
|  |  |  | 20 | 21 | 22 | 23 | 24 |
| Lubricating oil | Transmission oil (*1) |  | Balance | Balance | Balance | Balance | Balance |
| Defoaming agent | (A2) Defoaming agent D | Si ppm | 10 | 10 | 5 | 1 | 10 |
|  | (A2) Defoaming agent E | Si ppm |  |  |  |  |  |
|  | (A2) Defoaming agent F | Si ppm |  |  |  |  |  |
|  | (B) Defoaming agent H (*2) | Si ppm | 10 | 10 | 10 | 10 | 5 |
|  | (B) Defoaming agent I (*3) | Si ppm |  |  |  |  |  |
|  | (B) Defoaming agent J (*4) | Si ppm |  |  |  |  |  |
| Method for adding defoaming agents to lubricating oil (*5) |  |  | B | A | A | A | A |
| Diluting solvent |  |  | kerosene | kerosene | kerosene | kerosene | kerosene |
| Silicon content in mixed dilution |  | Si ppm | — | 8000 | 6000 | 4000 | 6000 |
| Amount of foaming in homogenizer test |  |  |  |  |  |  |  |
| Fresh oil |  | mL | 40 | 40 | 40 | 40 | 40 |
| Supernatant after 3 h centrifugation |  | mL | 40 | 40 | 40 | 40 | 40 |
| Silicon content in oil |  |  |  |  |  |  |  |
| Fresh oil |  | ppm | 20 | 20 | 15 | 11 | 15 |
| Supernatant after 3 h centrifugation |  | ppm | 10 | 15 | 11 | 4 | 13 |

|  |  |  | Examples | | | | |
| --- | --- | --- | --- | --- | --- | --- | --- |
|  |  |  | 25 | 26 | 27 | 28 | 29 |
| Lubricating oil | Transmission oil (*1) |  | Balance | Balance | Balance | Balance | Balance |
| Defoaming agent | (A2) Defoaming agent D | Si ppm | 10 | 10 | 1 |  |  |
|  | (A2) Defoaming agent E | Si ppm |  |  |  | 10 | 1 |
|  | (A2) Defoaming agent F | Si ppm |  |  |  |  |  |
|  | (B) Defoaming agent H (*2) | Si ppm | 100 |  |  | 10 | 10 |
|  | (B) Defoaming agent I (*3) | Si ppm |  | 10 | 10 |  |  |
|  | (B) Defoaming agent J (*4) | Si ppm |  |  |  |  |  |
| Method for adding defoaming agents to lubricating oil (*5) |  |  | A | A | A | A | A |
| Diluting solvent |  |  | kerosene | kerosene | kerosene | kerosene | kerosene |
| Silicon content in mixed dilution |  | Si ppm | 40000 | 8000 | 4000 | 8000 | 4000 |
| Amount of foaming in homogenizer test |  |  |  |  |  |  |  |
| Fresh oil |  | mL | 40 | 40 | 40 | 40 | 40 |
| Supernatant after 3 h centrifugation |  | mL | 40 | 40 | 40 | 40 | 40 |
| Silicon content in oil |  |  |  |  |  |  |  |
| Fresh oil |  | ppm | 110 | 20 | 11 | 20 | 11 |
| Supernatant after 3 h centrifugation |  | ppm | 40 | 15 | 4 | 14 | 4 |

(*1) Transmission oil obtained by removing defoaming agents from *ENEOS FINE AT FLUID* by JX Nippon Oil & Energy Corporation
(*2) KF-96 by Shin-Etsu Chemical Co., Ltd., viscosity: 50,000 cSt, dimethylsilicone defoaming agent
(*3) KF-96 by Shin-Etsu Chemical Co., Ltd., viscosity: 1,000,000 cSt, dimethylsilicone defoaming agent
(*4) FA-600 by Shin-Etsu Chemical Co., Ltd., viscosity: 10 cSt, fluorosilicone defoaming agent
(*5) Method for adding plurality of defoaming agents to lubricating oil: A) diluting both defoaming agents in a solvent, to obtain a mixed dilution, and thereafter adding the the dilution to the lubrication oil. B) preparing solvent dilutions of defoaming agents individually, and thereafter adding each dilution to the lubricating oil.

TABLE 4

|  |  |  | Examples | | | |
| --- | --- | --- | --- | --- | --- | --- |
|  |  |  | 30 | 31 | 32 | 33 |
| Lubricating oil | Transmission oil (*1) |  | Balance | Balance | Balance | Balance |
| Defoaming agent | (A2) Defoaming agent D | Si ppm |  |  |  |  |
|  | (A2) Defoaming agent E | Si ppm |  |  |  |  |
|  | (A2) Defoaming agent F | Si ppm | 10 | 1 | 10 | 10 |
|  | (B) Defoaming agent H (*2) | Si ppm | 10 | 10 |  |  |
|  | (B) Defoaming agent I (*3) | Si ppm |  |  | 10 | 5 |
|  | (B) Defoaming agent J (*4) | Si ppm |  |  |  |  |
| Method for adding defoaming agents to lubricating oil (*5) |  |  | A | A | A | A |
| Diluting solvent |  |  | kerosene | kerosene | kerosene | kerosene |
| Silicon content in mixed dilution |  | Si ppm | 8000 | 4000 | 8000 | 8000 |
| Amount of foaming in homogenizer test |  |  |  |  |  |  |
| Fresh oil |  | mL | 40 | 40 | 40 | 40 |
| Supernatant after 3 h centrifugation |  | mL | 40 | 40 | 40 | 40 |

TABLE 4-continued

| Silicon content in oil | | | | | | |
|---|---|---|---|---|---|---|
| Fresh oil | ppm | 20 | 11 | 20 | 15 | |
| Supernatant after 3 h centrifugation | ppm | 9 | 3 | 10 | 8 | |

| | | | Examples | | | | |
|---|---|---|---|---|---|---|---|
| | | | 34 | 35 | 36 | 37 | 38 |
| Lubricating oil | Transmission oil (*1) | | Balance | Balance | Balance | Balance | Balance |
| Defoaming agent | (A2) Defoaming agent D | Si ppm | | | 10 | 10 | 10 |
| | (A2) Defoaming agent E | Si ppm | | | | | |
| | (A2) Defoaming agent F | Si ppm | 10 | 10 | | | |
| | (B) Defoaming agent H (*2) | Si ppm | | | | | |
| | (B) Defoaming agent I (*3) | Si ppm | | | | | |
| | (B) Defoaming agent J (*4) | Si ppm | 10 | 5 | 5 | 10 | 100 |
| Method for adding defoaming agents to lubricating oil (*5) | | | A | A | A | A | A |
| Diluting solvent | | | MEK | MEK | MEK | MEK | MEK |
| Silicon content in mixed dilution | | Si ppm | 8000 | 8000 | 8000 | 8000 | 40000 |
| Amount of foaming in homogenizer test | | | | | | | |
| Fresh oil | | mL | 40 | 40 | 40 | 40 | 40 |
| Supernatant after 3 h centrifugation | | mL | 40 | 40 | 40 | 40 | 40 |
| Silicon content in oil | | | | | | | |
| Fresh oil | | ppm | 20 | 15 | 15 | 20 | 110 |
| Supernatant after 3 h centrifugation | | ppm | 7 | 6 | 12 | 14 | 45 |

(*1) Transmission oil obtained by removing defoaming agents from *ENEOS FINE AT FLUID* by JX Nippon Oil & Energy Corporation
(*2) KF-96 by Shin-Etsu Chemical Co., Ltd., viscosity: 50,000 cSt, dimethylsilicone defoaming agent
(*3) KF-96 by Shin-Etsu Chemical Co., Ltd., viscosity: 1,000,000 cSt, dimethylsilicone defoaming agent
(*4) FA-600 by Shin-Etsu Chemical Co., Ltd., viscosity: 10 cSt, fluorosilicone defoaming agent
(*5) Method for adding plurality of defoaming agents to lubricating oil: A) diluting both defoaming agents in a solvent, to obtain a mixed dilution, and thereafter adding the the dilution to the lubrication oil. B) preparing solvent dilutions of defoaming agents individually, and thereafter adding each dilution to the lubricating oil.

TABLE 5

| | | | Comparative Examples | | | | | |
|---|---|---|---|---|---|---|---|---|
| | | | 1 | 2 | 3 | 4 | 5 | 6 |
| Lubricating oil | Transmission oil (*1) | | Balance | Balance | Balance | Balance | Balance | Balance |
| Defoaming agent | (A1) Defoaming agent A | Si ppm | | | 10 | | | |
| | (A2) Defoaming agent D | Si ppm | | | | 10 | | |
| | Defoaming agent G | Si ppm | | | | | 10 | |
| | (B) Defoaming agent H (*2) | Si ppm | 10 | 30 | | | 10 | |
| | (B) Defoaming agent I (*3) | Si ppm | | | | | | |
| | (B) Defoaming agent J (*4) | Si ppm | | | | | | 10 |
| Method for adding defoaming agents to lubricating oil (*5) | | | — | — | — | — | A | — |
| Diluting solvent | | | kerosene | kerosene | kerosene | kerosene | kerosene | MEK |
| Silicon content in mixed dilution | | Si ppm | — | — | — | — | 4000 | — |
| Amount of foaming in homogenizer test | | | | | | | | |
| Fresh oil | | mL | 40 | 40 | 50 | 50 | 40 | 40 |
| Supernatant after 3 h centrifugation | | mL | 100 | 100 | 60 | 60 | 100 | 100 |
| Silicon content in oil | | | | | | | | |
| Fresh oil | | ppm | 10 | 30 | 10 | 10 | 20 | 10 |
| Supernatant after 3 h centrifugation | | ppm | <1 | <1 | 8 | 8 | <1 | <1 |

(*1) Transmission oil obtained by removing defoaming agents from *ENEOS FINE AT FLUID* by JX Nippon Oil & Energy Corporation
(*2) KF-96 by Shin-Etsu Chemical Co., Ltd., viscosity: 50,000 cSt, dimethylsilicone defoaming agent
(*3) KF-96 by Shin-Etsu Chemical Co., Ltd., viscosity: 1,000,000 cSt, dimethylsilicone defoaming agent
(*4) FA-600 by Shin-Etsu Chemical Co., Ltd., viscosity: 10 cSt, fluorosilicone defoaming agent
(*5) Method for adding plurality of defoaming agents to lubricating oil: A) diluting both defoaming agents in a solvent, to obtain a mixed dilution, and thereafter adding the the dilution to the lubrication oil. B) preparing solvent dilutions of defoaming agents individually, and thereafter adding each dilution to the lubricating oil.

(Method for Adding Plurality of Defoaming Agents: A)

When preparing the lubricating oil compositions of the examples 2 to 19 and 21 to 38 and comparative example 5, addition of a plurality of defoaming agents to each lubricating oil was conducted by the following procedures:

(i) each defoaming agent was dissolved in a solvent (kerosene or MEK (methyl ethyl ketone)), to prepare a dilution. The total concentration of the defoaming agents in the dilution was as in Tables 1 to 5.

(ii) the dilution obtained in the step (i) was added to a lubricating oil dropwise while stirring the resultant mixture. The amount of the added dilution was such that the defoaming agent concentrations as in Tables 1 to 5 were to be realized.

(Method for Adding Plurality of Defoaming Agents: B)

When preparing the lubricating oil compositions of examples 1 and 20, addition of a plurality of defoaming agents to each lubricating oil was conducted by the following procedures:

(i') kerosene delusions in which defoaming agents (defoaming agents A and H in example 1, and defoaming agents D and H in example 20) were dissolved in kerosene were individually prepared. The defoaming agent concentrations of the kerosene dilutions of the first defoaming agents (defoaming agents A and D) were each 4000 mass ppm in terms of silicon, and that of the kerosene dilution of the second defoaming agent (defoaming agent H) was 4000 mass ppm in terms of silicon.

(ii') the dilutions obtained in the step (i') were added to a lubricating oil dropwise while stirring the resultant mixture. The amounts of the added dilutions were such that the defoaming agent concentrations as in Tables 1 and 3 were to be realized.

(Evaluation of Defoaming Performance of Fresh Oil: Homogenizer Test)

Defoaming performance of each of the lubricating oil compositions prepared above was evaluated by a homogenizer test machine shown in FIG. 1. The homogenizer test machine shown in FIG. 1 includes a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised to 120° C. by the cylindrical heater for heating 2. An oil surface level at this time was recorded as a reference oil surface level 8. Then the oil was stirred with the homogenizer 1, and the difference between an oil surface level after 10 minutes stirring and the reference oil surface level was recorded as the amount of foaming. The results are shown in Tables 1 to 5.

(Evaluation of Storage Stability and Durability against Centrifugal Effect (1): Homogenizer Test)

(a) Centrifugation

Four glass centrifuge tubes filled to the 60 mL graduation mark with sample oil were prepared. These four centrifuge tubes with the sample oil were set in a centrifuge, and rotated at 25° C. at 10,000 rpm for 180 minutes. The relative centrifugal force in this rotation was 8,000 G on average. After the centrifugation, a supernatant (200 mL in total) was collected.

(b) Homogenizer Test

Defoaming performance of the collected supernatant was evaluated by the homogenizer test same as described above. The results are shown in Tables 1 to 5. It can be said that less increase of the amount of foaming after the centrifugation means a less tendency for the defoaming agents to cause segregation and precipitation during storage, and means less deterioration of defoaming performance due to centrifugal effect.

(Evaluation of Storage Stability and Durability against Centrifugal Effect (2): Measurement of Silicon content in Oil)

(a) Measurement of Silicon Content in New Oil

The silicon content in the fresh oil of each of the above prepared lubricating oil compositions was measured by inductively coupled plasma (ICP) atomic emission spectroscopy.

(b) Measurement of Silicon Content in Oil after Centrifugation

Each of the above prepared lubricating oil compositions was subjected to centrifugation in the same way as described above (at 25° C. at 8,000 G for 180 minutes). The silicon content in the oil of the collected supernatant was measured in the same way as described above by ICP atomic emission spectroscopy. It can be said that the silicon content in the oil after the centrifugal ion closer to that in the fresh oil means a less tendency for the defoaming agents to cause segregation and precipitation during storage, and means less loss of the defoaming agents due to centrifugal effect.

As can be seen from Tables 1 to 5, all the lubricant oil compositions of the present invention (examples 1 to 38) showed good not defoaming performance of the fresh oil, but also of the sample oil after the centrifugal ion. These lubricant oil compositions of the present invention also showed less decrease of the amounts of silicon in the oils even after the centrifugation. In contrast, in comparative examples 1, 2, 5 and 6, the sample oils after the centrifugal ion showed significantly deteriorated defoaming performance compared to that of the fresh oils. The silicon contents in the oils of these lubricant oil compositions of the comparative examples significantly decreased after the centrifugation. The compositions of comparative examples 3 and 4, each of which used the first defoaming agents A or D, showed better results than compositions of the other comparative examples, in both defoaming performance of the sample oil after the centrifugation, and suppression of the decrease of the silicon content in the oil. However, the compositions of examples 1-2, 5-7, 17-19, 20-21, 24-26, and 36-38, which used the same amount of the first defoaming agent A or D and the second defoaming agent in combination, showed much better results in both defoaming performance of the fresh oil and defoaming performance of the sample oil after the centrifugation.

The above test results shows that the lubricating oil composition of the present invention can suppress deterioration of defoaming performance even during long-term storage, and maintain defoaming performance of lubricating oil for a long term even under such lubricating conditions that the lubricating oil is subjected to high centrifugal effect.

The lubricating oil composition of the example 2, which was produced according to the method for defoaming a lubricating oil of the present invention, by diluting the defoaming agent A (first defoaming agent (A1)) and the defoaming agent H (second defoaming agent) in kerosene to obtain a mixed dilution, and thereafter adding the mixed dilution to the lubricating oil, showed further less decrease of the silicon content in the oil after the centrifugation, than the lubricating oil composition of example 1, which was produced by diluting the defoaming agents A and H in kerosene separately, and then adding the dilutions to the lubricating oil. Likewise, the lubricating oil composition of the example 21, which was produced by diluting the defoaming agent D (first defoaming agent (A2)) and the defoaming agent H (second defoaming agent) in kerosene to obtain a mixed dilution, and thereafter adding the mixed dilution to the lubricating oil, showed less decrease of the silicon content in the oil after the centrifugation, than the lubricating oil composition of example 20, which was produced by diluting the defoaming agents D and H in kerosene separately, and then adding the dilutions to the lubricating oil. These results shows that the method for defoaming a lubricating oil of the present invention can more effectively suppress deterioration of defoaming performance due to segregation and precipitation of the defoaming agents.

INDUSTRIAL APPLICABILITY

The lubricating oil composition of the present invention can suppress deterioration of defoaming performance even during long-term storage, and maintain defoaming performance of lubricating oil for a long term even under such lubricating conditions that the lubricating oil is subjected to high centrifugal effect. Thus, the defoaming agents and the lubricating oil composition of the present invention can be preferably employed for any lubricating oil composition that demands defoaming performance, and among them, can be especially preferably employed in lubricating oil used under such lubricating conditions that the lubricating oil is subjected to high centrifugal effect, for example, in automobile engine oil, automobile transmission oil, or automobile transaxle oil.

The method for defoaming a lubricating oil of the present invention can be preferably used so as to give defoaming performance to various lubricating oil compositions, and especially preferably used so as to give defoaming performance to a lubricating oil that is used under such lubrication conditions that the lubricating oil is subjected to centrifugal effect.

REFERENCE SIGNS LIST 1 homogenizer
2 cylindrical heater for heating
3 temperature adjuster
4 thermocouple for oil temperature measurement
5 electric power source for the heaters
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:
1. A lubricating oil composition comprising:
a lubricant base oil;
(A) a first defoaming agent obtained by polymerizing
  (b) at least one defoaming agent monomer in
  (a) a polymerization solvent under coexistence of
  (c) a polymer soluble in the polymerization solvent; and
(B) a second defoaming agent being a silicone defoaming agent.
2. The lubricating oil composition according to claim 1, the (b) at least one defoaming agent monomer comprising a first monomer, the first monomer giving a repeating unit represented by the following general formula (1) upon polymerization:

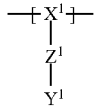

(1)

wherein in the general formula (1), $X^1$ is a repeating unit obtained by polymerization of an ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

(2)

wherein in the general formula (2), $R^1$ and $R^2$ are each independently a $C_{1-18}$ organic group or combination of two or more $C_{1-18}$ organic groups.

3. The lubricating oil composition according to claim 1, wherein a ratio of a content of the (A) first defoaming agent in terms of silicon to a content of the (B) second defoaming agent in terms of silicon is 0.01 to 100.

4. The lubricating oil composition according to claim 1, wherein
the polymerizing is carried out by dispersion polymerization; and
the (c) polymer soluble in the polymerization solvent is (c1) a polymer dispersant.

5. The lubricating oil composition according to claim 4, the (a) polymerization solvent comprising a hydrocarbon solvent having 6 or more carbons, a mineral oil, a synthetic oil, or an ester oil, or combination thereof.

6. The lubricating oil composition according to claim 4, the (c1) polymer dispersant comprising a polyalkyl (meth)acrylate having a weight average molecular weight of 10,000 to 1,000,000.

7. The lubricating oil composition according to claim 1, wherein the polymerizing is carried out by solution polymerization.

8. The lubricating oil composition according to claim 7, the (c) polymer soluble in the polymerization solvent comprising a polyalkyl (meth)acrylate having a weight average molecular weight of 10,000 to 1,000,000.

9. A method for defoaming a lubricating oil, the method comprising:
(i) dissolving or finely dispersing (A) a first defoaming agent and (B) a second defoaming agent in a diluting solvent, to obtain a dilution, such that a total concentration of the (A) first defoaming agent and the (B) second defoaming agent in the dilution is 500 to 50,000 mass ppm in terms of silicon; and
(ii) adding the dilution obtained in the step (i) to a lubricating oil,
the (A) first defoaming agent being obtained by a process, the process comprising:
  polymerizing (b) at least one defoaming agent monomer in (a) a polymerization solvent under coexistence of (c) a polymer soluble in the polymerization solvent; and
the (B) second defoaming agent being a silicone defoaming agent.

10. The method according to claim 9,
the diluting solvent comprising a hydrocarbon solvent having 6 or more carbons, a mineral oil, a synthetic oil, an ester oil, an aliphatic ether having 4 or more carbons, an ester of an aliphatic monocarboxylic acid having 2 or more carbons and a monoalcohol having 1 to 5 carbons, an aliphatic ketone having 3 or more carbons, an aliphatic alcohol having 4 or more carbons, or a halogenated hydrocarbon, or combination thereof.

11. The method according to claim 9, wherein the polymerizing is carried out by dispersion polymerization; and the (c) polymer soluble in the polymerization solvent is (c1) a polymer dispersant.

12. The method according to claim 9, wherein the polymerizing is carried out by solution polymerization.

13. A defoaming agent composition comprising:

(A) a first defoaming agent obtained by polymerizing (b) at least one defoaming agent monomer in (a) a polymerization solvent under coexistence of (c) a polymer soluble in the polymerization solvent; and (B) a second defoaming agent being a silicone defoaming agent.

14. The defoaming agent composition according to claim 13, further comprising:

a diluting solvent, the diluting solvent comprising a hydrocarbon solvent having 6 or more carbons, a mineral oil, a synthetic oil, an ester oil, an aliphatic ether having 4 or more carbons, an ester of an aliphatic monocarboxylic acid having 2 or more carbons and a monoalcohol having 1 to 5 carbons, an aliphatic ketone having 3 or more carbons, an aliphatic alcohol having 4 or more carbons, or a halogenated hydrocarbon, or combination thereof.

15. The defoaming agent composition according to claim 13, wherein the polymerization is carried out by dispersion polymerization; and the (c) polymer soluble in the polymerization solvent is (c1) a polymer dispersant.

16. The defoaming agent composition according to claim 13, wherein the polymerization is carried out by solution polymerization.

* * * * *